(12) United States Patent
Katagami et al.

(10) Patent No.: US 7,233,373 B2
(45) Date of Patent: Jun. 19, 2007

(54) COLOR FILTER SUBSTRATE, MANUFACTURING METHOD THEREOF, DISPLAYING DEVICE, ELECTRO-OPTICAL DEVICE AND ELECTRONIC INSTRUMENT

(75) Inventors: Satoru Katagami, Hara-mura (JP); Hisashi Aruga, Fujimi-machi (JP); Toshihiro Ushiyama, Chino (JP); Kunio Maruyama, Misato-mura (JP); Keiji Takizawa, Toyoshina-machi (JP)

(73) Assignee: Seiko Epson Corporation, Tokyo (JP)

( * ) Notice: Subject to any disclaimer, the term of this patent is extended or adjusted under 35 U.S.C. 154(b) by 36 days.

(21) Appl. No.: 10/894,435

(22) Filed: Jul. 20, 2004

(65) Prior Publication Data

US 2005/0057712 A1   Mar. 17, 2005

(30) Foreign Application Priority Data

| Jul. 23, 2003 | (JP) | ............................. 2003-278434 |
| Sep. 10, 2003 | (JP) | ............................. 2003-318436 |
| Jun. 3, 2004 | (JP) | ............................. 2004-165777 |

(51) Int. Cl.
G02F 1/1335 (2006.01)
G02F 1/1333 (2006.01)

(52) U.S. Cl. ........................ 349/113; 349/106; 349/110; 349/114; 430/7

(58) Field of Classification Search ................ 349/106, 349/110, 113, 114; 430/7
See application file for complete search history.

(56) References Cited

U.S. PATENT DOCUMENTS

| 6,414,732 B1* | 7/2002 | Matsumoto et al. ......... 349/106 |
| 6,611,303 B1* | 8/2003 | Lee et al. ...................... 349/65 |
| 6,801,274 B2 | 10/2004 | Suzuki |
| 6,872,586 B2* | 3/2005 | Kiguchi et al. ............... 438/28 |
| 6,900,864 B2* | 5/2005 | Iino ........................... 349/115 |
| 6,972,814 B2* | 12/2005 | Jung .......................... 349/114 |
| 6,981,761 B2* | 1/2006 | Usui et al. .................... 347/85 |
| 2003/0007112 A1* | 1/2003 | Matsushita et al. ......... 349/106 |

FOREIGN PATENT DOCUMENTS

| CN | 1405607 A | 3/2003 |
| JP | H10-186347 A | 7/1998 |
| JP | H11-183892 A | 7/1999 |
| JP | 2003-177410 A | 6/2003 |

* cited by examiner

Primary Examiner—Huyen Ngo
(74) Attorney, Agent, or Firm—Global IP Counselors, LLP

(57) ABSTRACT

A color filter substrate 304a includes a transparent substrate member 309a, a reflective film 312, coloring elements 316 that are formed on the reflective film 312 and have a plurality of colors, light blocking members 313, and transparent banks 314 that are formed on the reflective film 312 at boundaries between the coloring elements 316. The coloring elements 316 are formed by depositing coloring liquids to deposit portions with an ink jet technology and drying the coloring liquids. The deposit portions are defined by the banks 314 and the light blocking members 313. The transparent banks 314 partially expose the reflective film 312.

33 Claims, 26 Drawing Sheets (a) Stripe-like pattern (b) Mosaic pattern (c) Delta pattern

COLOR FILTER SUBSTRATE, MANUFACTURING METHOD THEREOF, DISPLAYING DEVICE, ELECTRO-OPTICAL DEVICE AND ELECTRONIC INSTRUMENT

BACKGROUND OF THE INVENTION

1. Field of the Invention

The present invention concerns a color filter substrate having high visibility, a method of manufacturing such color filter substrate, a displaying device having such color filter substrate, an electro-optical device having such color filter substrate and an electronic instrument having such color filter substrate.

2. Background Information

A conventional liquid crystal display device is known to be equipped with a color filter substrate that functions both as a reflective display that uses external light and a transmissive display that uses a backlight. When such conventional liquid crystal display device functions as a reflective display, colored light is obtained when the incoming light from outside passes through coloring layers that are provided for color-display purposes. Accordingly, the display is inevitably darkened because the incoming light is partially absorbed by the coloring layers. To prevent this problem, as disclosed in Japanese Laid-open Patent Application Publication No. H11-183892, it has been known to provide in portions of the coloring layers colorless openings and reflecting films that correspond to the openings, such that part of the incoming light passes through the openings to be reflected at the reflecting films as colorless light without being absorbed by the coloring layers. By mixing the colorless light with colored light, it is possible to obtain a brighter display than the case where all of the incoming light passes through the coloring layers and becomes colored.

Electro-optical devices such as liquid crystal devices and organic EL devices that have the color display function have been known. These types of electro-optical devices internally contain a color filter substrate. The color filter substrate is formed, for instance, with R (red), G (green) and B (blue) coloring elements disposed in a predetermined arrangement on a substrate of, for example, transparent glass.

There are three known types of liquid crystal devices. The first is so-called a reflective type liquid crystal device in which external light such as the sun light or room light is reflected internally within the device such that the reflected light is displayed. The second is so-called a transmissive type liquid crystal device in which the light is emitted by a cold cathode tube, LED (light emitting diode) or other light source and passes through inside the liquid crystal device. The third is a semi-transmissive-reflective type liquid crystal device that has functions of both of the reflective and transmissive type liquid crystal devices.

In both the reflective and semi-transmissive-reflective type liquid crystal devices, when the display uses reflected light to display image, the external light passes through coloring elements of the color filter twice, which increases color absorption and reduces the display brightness. To solve this problem, a reflective type liquid crystal devices that have within the pixel area an uncolored region, in other words an exposed reflective film, is known. Japanese Laid-Open Patent Application Publication 10-186347 in FIG. 1 shows such reflective type liquid crystal device. In this liquid crystal device, the passage of bright light through the exposed region of the reflective film prevents the reduction in brightness of color display.

However, in Japanese Laid-open Patent Application No. H11-183892, in order to implement the conventional arrangement described above, parts of the coloring layers need to be formed as openings that act as non-coloring layers. In other words, the coloring layers must be formed so as to be divided into coloring components and non-coloring components. Additionally, the coloring layers are generally closely disposed next to one another. Accordingly, colors tend to overlap because of two or more coloring layers overlapping one another, or gaps may be found in the outputted light because of gaps that are formed in between the coloring layers. This is a problem in that such overlapped colors and gaps yield a display with poor contrast, not only in the case of a reflective display, but also in the case of a transmissive display as well. Also in the liquid crystal device disclosed in Japanese Laid-Open Patent Application Publication 10-186347, since an exposed reflective film is placed inside the black mask, in other words since the exposed reflective film is placed in a region that is separate from the black mask, the available areas for the coloring elements are reduced.

In view of the above, it will be apparent to those skilled in the art from this disclosure that there exists a need for an improved color filter substrate having high visibility, a method of manufacturing such color filter substrate, a displaying device having such color filter substrate, an electro-optical device having such color filter substrate and an electronic instrument having such color filter substrate, that overcome the problems of the conventional art. This invention addresses this need in the art as well as other needs, which will become apparent to those skilled in the art from this disclosure.

SUMMARY OF THE INVENTION

An object of the present invention is to provide a color filter substrate having high visibility with a bright display, good color contrast, and excellent visibility, while maintaining the exposed region in the reflective film. It is also an object of the present invention to provide a method of manufacturing such color filter substrate, a displaying device having such color filter substrate, an electro-optical device having such color filter substrate and an electronic instrument having such color filter substrate.

A color filter substrate of a first aspect of the present invention includes a light transmissive substrate, a reflective film, a plurality of coloring elements, and a plurality of transparent banks. The plurality of coloring elements is formed on the reflective film, and has at least two different colors. The plurality of transparent banks is formed on the reflective film at boundaries between the coloring elements.

A color filter substrate of a second aspect of the present invention includes a light transmissive substrate; a reflective layer formed on the substrate, the reflective layer having openings formed thereon; a plurality of boundary layers formed on the reflective layer, some of the boundary layers being light transmissive boundary layers, and others being colored boundary layers; and a plurality of coloring layers enclosed by the boundary layers. The colored boundary layers are disposed between coloring layers of the same color, while the light transmissive boundary layers are disposed between coloring layers of different colors.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
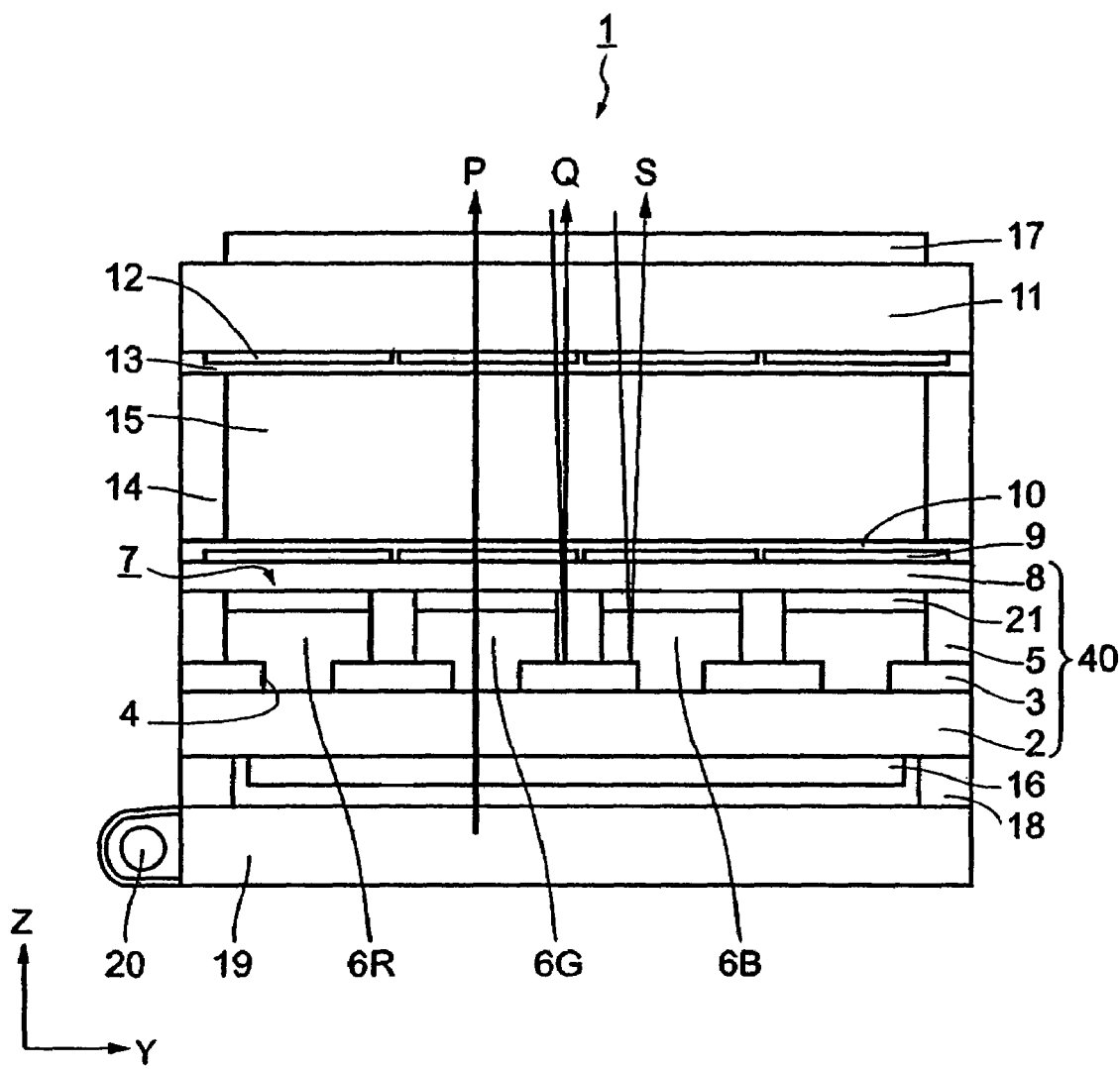
FIG. 1 is a cross sectional view of the semi-transmissive-reflective displaying device according to the first embodiment of the present invention.

Basically, in the present invention, the color filter substrate of the present invention includes a transparent substrate, a reflective film formed on the substrate, a plurality of coloring elements formed on the reflective film, the coloring elements having at least two different colors, and a plurality of transparent banks formed on the reflective film at boundaries between the coloring elements. Herein, "transparent" means higher light transmissivity than the coloring elements. More specifically, a transparent film should have a light transmissivity of equal to or greater than 50%, preferably equal to or greater than 80%, against a light having a wave length of 400–700 nm.

With this color filter substrate, since banks that partition the coloring elements are transparent, the banks themselves perform the function of exposing the reflective film. Therefore, as compared to a conventional arrangement where a transparent region that exposes the reflective film is formed inside the black mask, it is possible to secure a greater area for the coloring elements and obtain adequate color saturation. Also, since the color filter of the present invention has a structure in which the color elements are arranged in regions that are defined by the banks, it is possible to manufacture the coloring elements by depositing droplets, in other words by using an ink jet technology.

Here, the ink jet technology refers to a technology of jetting out materials of the coloring elements as ink droplets from nozzles such that the ink droplets are attached to desired positions. The jetting out of the ink can be performed by changing the inner volume of the nozzle with a piezo element, or by depositing the ink through heat expansion, or by any other jetting-out methods that are apparent to those skilled in the art.

The color filter substrate preferably also includes a plurality of light blocking members formed on the reflective film at boundaries between the coloring elements. In this case, since the light blocking members function as the black mask, it is possible to obtain a display with good color contrast.

In the color filter substrate describe above, the plurality of banks preferably extends linearly in a first direction so as to be parallel to one another, the plurality of light blocking members extends linearly in a second direction so as to be parallel to one another, the second direction being perpendicular to the first direction. A gap between the banks being a second direction width of the coloring elements that are disposed between the banks, while a gap between the light blocking members being a first direction width of the coloring elements that are disposed between the light blocking members. With this arrangement, the light blocking members are aligned in one of the longitudinal and latitudinal directions, while the transparent banks are aligned in the other of the longitudinal and latitudinal directions. The light blocking members and the transparent banks thus enclose the coloring elements.

In the color filter of the present invention, the area of each of the plurality of banks is determined based on the color of the coloring element that is adjacent to the bank. The Applicants have, in Japanese Patent Application 2002-2340291, disclosed a color filter substrate that obtains bright uncolored reflected light through banks and island-type bank regions that are provided as uncolored reflective regions in each of the coloring element regions. The size of the uncolored reflective region is closely related to the color of the coloring element. For instance, where R(red), B(blue), and G(green) are used for the coloring elements, by changing the areas of the uncolored reflective regions for each of the three colors R, G, B, it is possible to adjust the color balance of color display according to a viewer's preference. In the present invention also, by changing the areas of the transparent banks according to the color of the coloring elements, it is possible to adjust the brightness of each color individually. Therefore, it is possible to adjust the color balance in the color display.

In the color filter substrate in which the areas of the banks are adjustable according to the color of the coloring elements, where a coloring element of a first color requires a transparent region whose area is $A_1$ and a coloring element of a second color requires a transparent region whose area is $A_2$, then an area of a bank that is adjacent to the coloring element of the first color and the coloring element of the second color is preferably $A_1/2+A_2/2$. In other words, the area of a bank is a sum of halves of the required transparent areas of the adjacent coloring elements. That is, a required transparent area of one coloring element is equally allocated to two adjacent banks.

In the color filter substrate of the present invention, the coloring elements have any three colors such as R(red), G(green), B(blue), C(cyan), M(magenta), or Y(yellow). Preferably, the coloring elements are disposed such that their colors form a stripe-like pattern. This stripe-like pattern herein refers to a pattern in which coloring elements of the same color are aligned in one line in the longitudinal directions, and lines of different colors are disposed in the latitudinal direction. An example of such stripe-like pattern is shown in FIG. 20(a).

Figure 20:
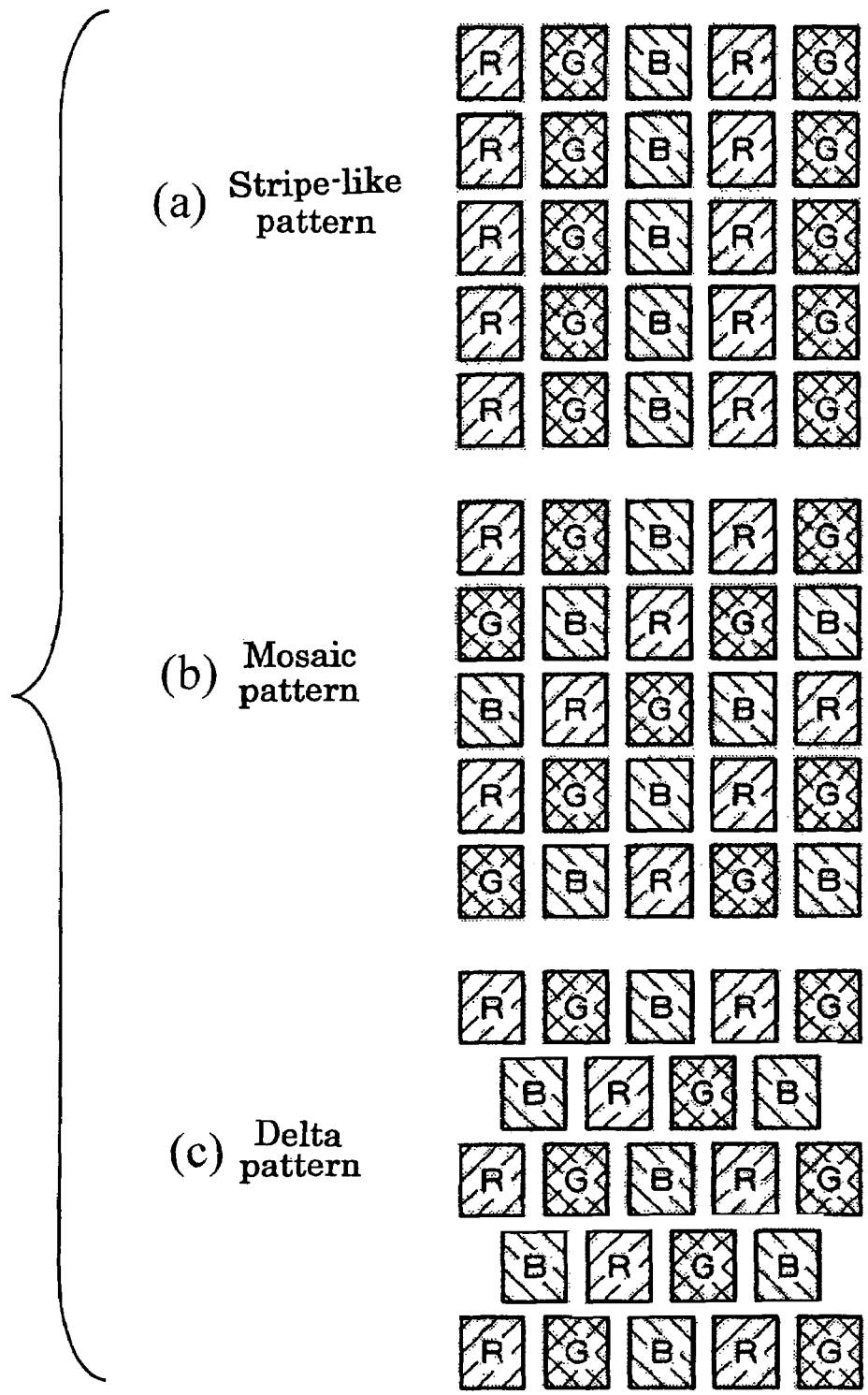
FIG. 20 are schematic views of examples of placement patterns of R, G and B coloring elements that are formed on the color filter substrate, FIG. 20(a) being a stripe-like pattern, FIG. 20(b) being a mosaic pattern, and FIG. 20(c) being a delta pattern.

The coloring elements can alternatively be arranged in other patterns, such as a mosaic pattern shown in FIG. 20(b), or a delta pattern shown in FIG. 20(c). In the mosaic pattern, the three colors (R, G, and B in the example of FIG. 20(b)) are repeated in the same order in both the longitudinal and latitudinal directions. In the delta pattern, each of the three colors is disposed at an end of a triangle, and also the three colors are repeated in the same order in the latitudinal direction.

Also, the color filter substrate of the present invention can be disposed opposite an element substrate that has a plurality of line wirings therein. The banks are preferably adapted to be disposed opposite the line wirings. The banks are also preferably sized to be thicker than the line wirings. Since the line wiring of the element substrate does not allow transmission of light therethrough, the line wiring functions as a black mask. By forming the transparent bank thicker than the line wiring, it is possible to effectively utilize uncolored reflective light that passes through the bank.

In this case, where a coloring element of a first color requires a transparent region whose area is $A_1$, a coloring element of a second color requires a transparent region whose area is $A_2$, and an area of the line wiring is $A_L$, then an area of a bank that is adjacent to the coloring element of the first color and the coloring element of the second color is $A_1/2+A_2/2+A_L$. Accordingly, it is possible to effectively utilize uncolored reflective light that passes through the bank.

A color filter substrate of the present invention also includes a light transmissive substrate; a reflective layer formed on the substrate, the reflective layer having openings formed thereon; a plurality of boundary layers formed on the reflective layer, some of the boundary layers being light transmissive boundary layers, and others being colored boundary layers; and a plurality of coloring layers enclosed by the boundary layers. The colored boundary layers are disposed between coloring layers of the same color. The light transmissive boundary layers are disposed between coloring layers of different colors.

With this arrangement, the boundary layers ate disposed between the coloring layers (coloring elements). Accordingly, it is possible to align the boundary layers in an orderly manner. There will be no random overlap of coloring layers of different colors. Thus, it is possible to obtain good color contrast. Furthermore, since external incident light passes through the light transmissive boundary layer after being reflected, the brightness of the display is also improved. Still furthermore, the colored boundary layers (light blocking members) are disposed between coloring layers of the same color. Even when a colored boundary layer is accidentally colored during the manufacturing process of the coloring layer of the same color, there will be no impact on the display. Thus, the manufacturing process of the color filter substrate can be simplified.

Preferably, widths of the boundary layers are determined based on widths of the coloring layers. Also, the plurality of coloring layers is preferably formed by depositing droplets of a prescribed liquid with a discharging device. With such arrangement, the size of the coloring elements can be changed by simply modifying the width of the boundary layers, without affecting other portions of the color filter substrate. Therefore, it is easy to perform a balance adjustment such as reducing the area of a coloring layer having a color that is easily perceived. Also, by forming the coloring layers with a discharging device, it is possible to deposit droplets in a consistent manner. Therefore, coloring layers having uniform thicknesses with little variances in droplets application areas can be obtained.

The color filter substrate preferably further includes an overcoat layer formed to cover the boundary layers and the coloring layers. Also, the reflective layer preferably has an irregular surface that scatters light. The boundary layers are formed on the irregular surface of the reflective layer.

With this arrangement, since the reflective layer (reflective film) has an irregular surface that scatters light, incident light is scattered at the reflective layer. Therefore, it is possible to prevent reflection of images from the light-incoming direction, such as eyes and faces of the viewer, from forming on the display.

Preferably, widths of the boundary layers are determined based on widths of the coloring layers. Also, the plurality of coloring layers is preferably formed by depositing droplets of a prescribed liquid with a discharging device.

Preferably, portions of the overcoat layer that are opposite the reflective layer are thicker than the rest of the overcoat layer. In this case, since the portions of the overcoat layer opposite the reflective layer are thicker, the liquid crystal adjacent to the thick portion of the overcoat layer is proportionally thinner. Accordingly, a reduction in the brightness that occurs as the reflective light from the light transmissive boundary layers (bank) and the coloring layers passes through the liquid crystal is suppressed. Therefore, it is possible to obtain a bright display.

A method of manufacturing a color filter substrate of the present invention includes providing a light transmissive substrate, forming a reflective layer on the substrate, the reflective layer having openings, forming boundary layers on the reflective layer, some of the boundary layers being colored boundary layers, others being light transmissive boundary layers, and forming a plurality of coloring layers that are enclosed by the boundary layers, such that the colored boundary layer are disposed between coloring layers of the same color and the light transmissive boundary layer are disposed between coloring layers of different colors. Preferably, widths of the boundary layers are determined based on widths of the coloring layers. Also, the plurality of coloring layers is preferably formed by depositing droplets of a prescribed liquid with a discharging device.

A method of manufacturing a color filter substrate of the present invention includes providing a light transmissive substrate, forming a reflective layer on the substrate, the reflective layer having openings, the reflective layer being formed to have an irregular surface that scatters light, forming boundary layers on the irregular surface of the reflective layer, some of the boundary layers being colored boundary layers, others being light transmissive boundary layers, forming a plurality of coloring layers that are enclosed by the boundary layers, and forming an overcoat layer that covers the boundary layers and the coloring layers. Preferably, widths of the boundary layers are determined based on widths of the coloring layers. Also, the plurality of coloring layers is preferably formed by depositing droplets of a prescribed liquid with a discharging device.

Still another method of manufacturing a color filter substrate of the present invention includes providing a substrate, forming a reflective film on the substrate, forming a plurality of rows of light blocking member, the rows of light blocking members extending in a first direction so as to be parallel to one another, forming a plurality of rows of transparent banks, the rows of transparent banks extending in a second direction so as to be parallel to one another, the second direction being perpendicular to the first direction, and forming a plurality of coloring elements by depositing prescribed fluid in a plurality of deposit portions that are defined by the light blocking members and the transparent banks, the coloring elements having at least two different colors and being disposed so as to form a prescribed pattern.

With this color filter substrate, since banks that partition the coloring elements are transparent, the banks themselves perform the function of exposing the reflective film. Therefore, as compared to a conventional arrangement where a transparent region that exposes the reflective film is formed inside the black mask, it is possible to secure a greater area for the coloring elements and obtain adequate color saturation. Also, since the coloring elements are formed using a deposit discharging technology, in other words an ink jet technology, the manufacturing process can be simplified and the ink consumption can be reduced, as compared with the conventional case where the coloring elements are formed with a photolithography process.

In the above-described method of manufacturing the color filter substrate, in the forming of the banks, an area of each of the transparent banks is preferably determined based on areas of coloring elements that are adjacent to the transparent bank in the forming of the transparent banks. In this manner, it is possible to adjust the color balance of the color display as desired.

In the method of manufacturing a color filter substrate described above, where a coloring element of a first color requires a transparent region whose area is $A_1$ and a coloring element of a second color requires a transparent region whose area is $A_2$, then an area of a bank that is adjacent to the coloring element of the first color and the coloring element of the second color is preferably $A_1/2+A_2/2$. In this manner, a required transparent area of one coloring element is equally allocated to two adjacent banks.

In the method of manufacturing a color filter substrate described above, the three colors (R, G, B) of the coloring elements are disposed so as to form a stripe-like pattern.

In the method of manufacturing a color filter substrate described above, the color filter substrate of the present invention can be disposed opposite an element substrate that has a plurality of line wirings therein. The banks are preferably adapted to be disposed opposite the line wirings. The banks are also preferably sized to be thicker than the line wirings during the forming of the banks.

In the method of manufacturing a color filter substrate described above, where a coloring element of a first color requires a transparent region whose area is $A_1$, a coloring element of a second color requires a transparent region whose area is $A_2$, and an area of the line wiring is $A_L$, then an area of a bank that is adjacent to the coloring element of the first color and the coloring element of the second color is $A_1/2+A_2/2+A_L$.

An electro-optical device of the present invention includes a color filter substrate according to the present invention, a counter substrate disposed opposite the color filter substrate; and an electro-optical layer provided underneath the counter substrate. Possible examples of such electro-optical devices include liquid crystal devices, organic EL devices, plasma display devices, and various other devices.

With this electro-optical device, since banks that partition the coloring elements are transparent, the banks themselves perform the function of exposing the reflective film. Therefore, as compared to a conventional arrangement where a transparent region that exposes the reflective film is formed inside the black mask, it is possible to secure a greater area for the coloring elements and obtain adequate color saturation. In this manner, it is possible to provide bright-colored displays in electro-optical devices.

An electronic device of the present invention preferably includes the aforementioned electro-optical device and control means for controlling the electro-optical device. Possible examples of electronic devices of the present invention include portable phones, portable information terminals, PDAs (Personal Digital Assistants), wrist watches, electronic dictionaries, portable game devices, portable televisions and other devices.

A display device of the present invention has a color filter substrate that has a light transmissive substrate, a reflective layer formed on the substrate, the reflective layer having openings formed thereon, a plurality of boundary layers formed on the reflective layer, some of the boundary layers being light transmissive boundary layers, and others being colored boundary layers, and a plurality of coloring layers enclosed by the boundary layers. The colored boundary layers are disposed between coloring layers of the same color. The light transmissive boundary layers are disposed between coloring layers of different colors. Preferably, widths of the boundary layers are determined based on widths of the coloring layers. Also, the plurality of coloring layers is preferably formed by depositing droplets of a prescribed liquid with a discharging device.

The color filter substrate of the display device preferably further includes an overcoat layer formed to cover the boundary layers and the coloring layers. The reflective layer has an irregular surface that scatters light. The boundary layers are formed on the irregular surface of the reflective layer.

Preferably, widths of the boundary layers are determined based on widths of the coloring layers. Also, the plurality of coloring layers is preferably formed by depositing droplets of a prescribed liquid with a discharging device. Further, portions of the overcoat layer that are opposite the reflective layer are preferably thicker than the rest of the overcoat layer.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

With reference to the drawings attached hereto, liquid crystal displaying devices according to preferred embodiments of the color filter substrate of the present invention will be explained. The liquid crystal displaying device includes both reflecting display mode that utilizes reflected external light for display, and transmissive display mode that utilizes back light for display. In other words, the device is a so-called semi-transmissive-reflective liquid crystal displaying device of an energy saving type, and is provided with coloring layers to enable color display, and uses either of the display modes as optimally suitable under the ambient light.

First Embodiment

Figure 2:
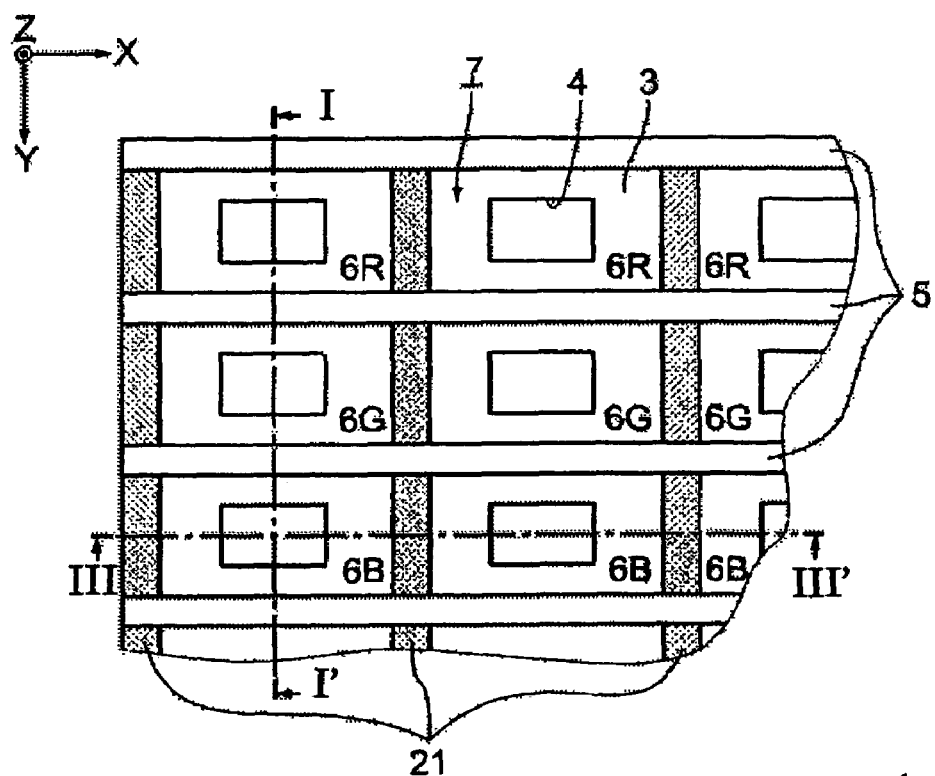
FIG. 2(a) is a top view of the arrangement of boundary layers in the semi-transmissive-reflective displaying device according to various embodiments of the present invention.
FIG. 2(b) is a top view of the arrangement of boundary layers with narrow green boundary layers.
Figure 2:
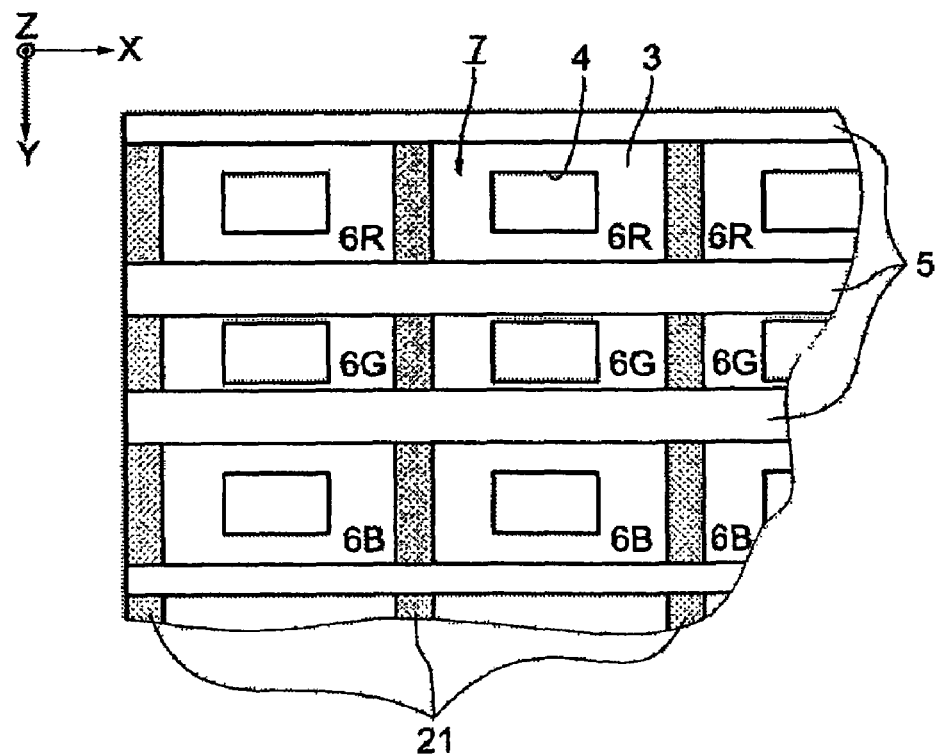
Figure 3:
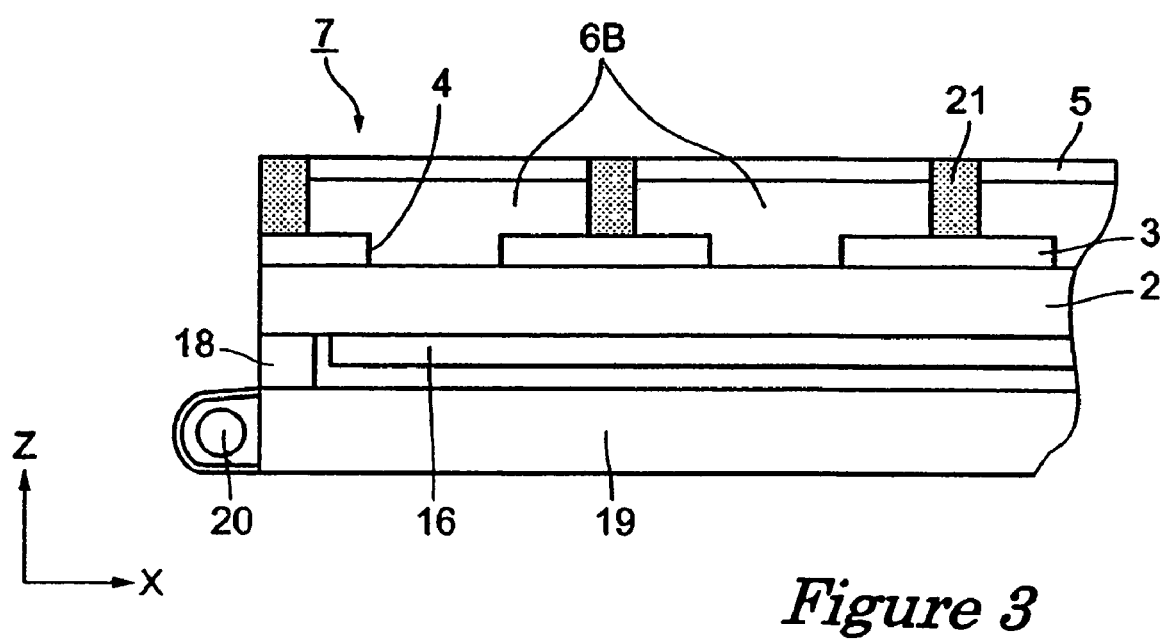
FIG. 3 is an enlarged cross sectional view of the colored boundary layer according to the first embodiment of the present invention.

FIG. 1 shows a cross section of a semi-transmissive-reflective liquid crystal displaying device in accordance with the present invention. In the cross section, the side of a liquid crystal 15 where a light source 20 is disposed is called the back side, and the other side is called the front side. The displayed contents are normally viewed from the front side. FIGS. 2(a) and 2(b) are top views of the arrangement of the boundary layers, which are the essential part of the present invention. More specifically, FIG. 2(a) shows a top view of one example of the arrangement of boundary layers in the semi-tranmissive-reflective displaying device according the present invention while FIG. 2(b) shows a top view of another example of the arrangement of boundary layers in which green boundary layers are formed narrower than read and blue boundary layers. A plurality of light transmissive uncolored boundary layers 5, which extends along the X-axis so as to be parallel to one another, and a plurality of non-light transmissive, colored boundary layers 21, which extends along the Y-axis so as to be parallel to one another, the Y-axis being perpendicular to the X-axis, are arranged into a grid form. A cross section (I–I') of the uncolored boundary layers 5 is shown in FIG. 1. A cross section (III–III') of the colored boundary layers 21 is shown in FIG. 3. A gap between adjacent uncolored boundary layers 5 is a Y-axis width of the coloring layers 6 that are disposed between the uncolored boundary layers 5. Likewise, a gap between adjacent colored boundary layers 21 is a X-axis width of the coloring layers 6 that are disposed between the colored boundary layers 21.

As shown in FIG. 1, a semi-transmissive-reflective liquid crystal displaying device 1 has a light-transmissive rear substrate 2 and a front substrate 11 that are disposed so as to face each other, and a color filter substrate 40. As shown in FIGS. 2(a) and 2(b), the color filter includes: a reflective layer 3 which is formed on the front side of rear substrate 2 and has openings 4; uncolored boundary layers 5 and colored boundary layers 21 which are formed over the reflective layer 3 and disposed to surround the openings 4; a plurality of deposit portions 7 enclosed by the uncolored boundary layers 5 and the colored boundary layers 21, and coloring layers 6R, 6G, 6B which are formed by depositing a prescribed coloring liquid with a droplet discharging device, which will be further described later; and an overcoat layer 8 applied to cover all of the uncolored boundary layers 5, the colored boundary layers 21 and the coloring layers 6R, 6G and 6B.

Pixel electrodes 12 that are disposed so as to correspond to the coloring layers 6R, 6G, and 6B, and an orientation film 13 that covers the pixel electrodes 12 are formed on the back side of the front substrate 11. Counter electrodes 9 that are disposed opposite the pixel electrodes 12, and an orientation film 10 that covers the counter electrodes 9 are formed on the overcoat layer 8 described above. A seal 14 is formed along the external periphery of the front substrate 11 between the orientation film 10 and orientation film 13, and liquid crystal 15 is sealed in the space formed by the seal 14, the orientation film 10, and the orientation film 13. Also provided are a front-face polarizing plate 17 attached to the front side of the front substrate 11, a back-face polarizing plate 16 attached to the back side of the back substrate 2, an optical waveguide plate 19 provided via a buffer 18 so as to cover the entire back side of the back-face polarizing plate 16, and a light source 20 for supplying light to the optical waveguide plate 19.

The coloring layers 6R, 6G, and 6B are arranged in an orderly fashion in a grid. Coloring layers 6 of the same color form a row in the X-axis direction, while coloring layers 6R, 6G, and 6B of different colors are aligned in the Y-axis direction. The uncolored boundary layers 5 are arranged at the borders between coloring layers 6 of differing colors, while the colored boundary layers 21 are arranged at the borders between coloring layers 6 of the same color. In other words, both the uncolored boundary layers 5 and colored boundary layers 21 are placed at the borders of the coloring layers 6R, 6G, and 6B. Therefore, it is possible to avoid problems such as poor color contrast that occurs due to colors overlapping each other or gaps being formed between the coloring layers 6. Accordingly, it is possible to obtain a sharp display. Here, the uncolored boundary layer 5, the counter electrodes 9, the pixel electrodes 12, the orientation films 10 and 13, and the overcoat layer 8 are preferably also light-transmissive.

Reflective Display Mode

The reflective display mode of the semi-light-transmissive reflecting liquid crystal display device 1 thus configured will be described referring to FIG. 1. Among various external lights that enter the front-face polarizing plate 17, the front-face polarizing plate 17 allows only lights that are in the transmission direction (transmission axis direction), such as external lights Q and S, to pass through. External lights that enter from other directions are absorbed by the front-face polarizing plate 17. Once the external lights Q and S have passed through the front-face polarizing plate 17, they further pass through: the pixel electrodes 12→the orientation film 13→the liquid crystal 15→the orientation film 10→the counter electrodes 9→the overcoat layer 8, in this order. After the overcoat layer 8, the external light Q in this arrangement passes through the uncolored boundary layer 5 and reaches the reflecting layer 3. The external light S in FIG. 1 passes through the coloring layer 6B and reaches the reflecting layer 3. The external light S is then reflected by the reflecting layer 3, and again passes through the coloring layer 6B. The external light S exits from the front side as colored light that is colored in the color of the coloring layer 6B, after passing through, in a reverse order, the layers which it entered.

Out of external light S, all light of wavelengths other than that of the respective color of the coloring layer 6 is absorbed by the coloring layer 6. Since the external light S passes through the coloring layer 6 twice, its brightness is reduced accordingly. Brightness tends to be further reduced if the thickness of the coloring layers 6 is increased in order to increase color saturation. However, because the colorless external light Q passes through the uncolored boundary layer 5 without passing through the coloring layers 6, it exits without any change in its original brightness. Consequently, in order to increase the brightness of the external light S, the external lights Q and S are caused to exit from the front face simultaneously, and the overall brightness is maintained by their joint effects. The light that is brightened by mixing the colored light with the colorless light is perceived as colored light by human eyes, since human eyes cannot distinguish between colored light and colorless light.

The uncolored boundary layers 5 that have above-described effects are made of an acrylic resin or epoxy resin with good light transmission property, and are aligned along the boundaries between coloring layers 6 of different colors, such that the overall brightness of the coloring layers 6 is balanced and an easily readable display is obtained. The colored boundary layers 21 are resin-made and aligned along the boundaries between coloring layers 6 of the same color. The colored boundary layers 21 are black and therefore yield good color contrast. Also, since the colored boundary layers 21 are black, even when the depositing device that will be described below deposits colored fluid onto the colored boundary layers 21 during the process of manufacturing the coloring layers 6, it has no effect on the display. Accordingly, the colored fluid can be continuously discharged onto multiple coloring layers 6. Both of these colored and uncolored boundary layers 5 and 21 are usually formed by a dispenser, screen printing, or the like.

Among lights that are colored by passing through the coloring layers 6R, 6G and 6B, green light is more visible to human eyes than red and blue light. To reiterate, even when the areas of the coloring layers 6G are reduced as shown in FIG. 2(*b*), green light is as recognizable to human eyes as light of other colors, and consequently will not give an impression to the viewer that the green light of the display is weak or unclear. In other words, even when the areas for the coloring layers 6G are relatively smaller than areas for coloring layer of other colors, it will not cause a color imbalance in the resultant display. This phenomenon can be utilized to increase the overall brightness of the display in the reflective display mode by widening the width of uncolored boundary layers 5 that are adjacent to the coloring layer 6G while reducing the width of the coloring layers 6G, thereby expanding the areas where the uncolored external light Q passes through. Adjusting the width of the uncolored boundary layers 5 in such a manner not only improves the display brightness but also helps reduce the green coloring liquid consumption. A similar balance adjustment may also be instituted on colors other than green.

The reflecting layer 3 formed on the back substrate 2 uses a thin film made of metals such as silver, aluminum, nickel, and chrome to reflect light. The overcoat layer 8 flattens irregular surfaces created during the formation of the uncolored boundary layers 5, the colored boundary layers 21, and the coloring layers 6R, 6G, and 6B, and thereby facilitates formation of the counter electrodes 9. The orientation films 10 and 13 cover and protect the counter electrodes 9 and pixel electrodes 12, respectively, and are designed to prevent organic ingredients and the like from exuding into and degrading the liquid crystal 15.

In the liquid crystal 15, the orientation of liquid crystal molecules is varied according to the electric field applied between the pixel electrodes 12 and the counter electrodes 9 that are positioned to sandwich the liquid crystal 15 from front and rear sides, such that the transmitted light is controlled according to the orientation of the liquid crystal molecules. Consequently, the counter electrodes 9 and the pixel electrodes 12 are arranged in pairs in positions opposite the uncolored boundary layers 5 of each of the coloring layers 6R, 6G, and 6B, such that the transmission and blockage of light and the brightness of each color are controlled to depict prescribed patterns. In the areas of the uncolored boundary layers 5, each of the counter electrodes 9 that are disposed adjacent one another with an uncolored boundary layers 5 in between is arranged to cover half the width of the uncolored boundary layer 5. In other words, each pair of the counter electrode 9 and pixel electrode 12 controls the transmission or blockage of external light Q and external light S that pass through the corresponding area. Also as seen in FIG. 1, the external lights Q and S also pass through the liquid crystal 15 twice just as they pass through the coloring layer 6 twice.

Transmissive Display Mode

A brief description of the transmissive display mode will be given next. In the transmissive display mode, transmission light P emitted from the light source 20 is used instead of the external lights Q and S that are used in the reflective display mode. The transmission light P is guided to the back-face polarizing plate 16 by the optical waveguide plate 19, such that only light in the transmission direction (transmission axis direction) of the back-face polarizing plate 16 passes through the back-face polarizing plate 16. The resultant light that passed through the back-face polarizing plate 18 then passes through the back substrate 2 and enters the coloring layers 6R, 6G, and 6B through the openings 4. The transmission light P that entered the coloring layers 6R, 6G, and 6B is colored in the color of the coloring layers 6 in which the transmission light P entered, and exits from the front side passing through: the overcoat layer 8→the counter electrodes 9→the orientation film 10→the liquid crystal 15→the orientation film 13→the pixel electrodes 12→the front substrate 11→the front-face polarizing plate 17. Usually, the transmission light P passes through the coloring layers 6 and liquid crystal 15 only once. There if the external light S that enters the front face and the transmission light P that comes out of the light source 20 are of the same brightness, the transmission light P will be brighter when it exits from the front face. The present invention is designed so that the brightness of the reflective display is increased by the addition of the bright external light Q to the external light S, so that the difference in brightness between the reflective display mode and the transmissive display mode is extremely small.

Second Embodiment

The liquid crystal display device in accordance with a second embodiment of the present invention will next be described. In view of the similarity between the first and second embodiments, the parts of the second embodiment that are identical to the parts of the first embodiment will be given the same reference numerals with a prime (') as the parts of the first embodiment. Moreover, the descriptions of the parts of the second embodiment that are identical to the parts of the first embodiment may be omitted for the sake of brevity.

Figure 4:
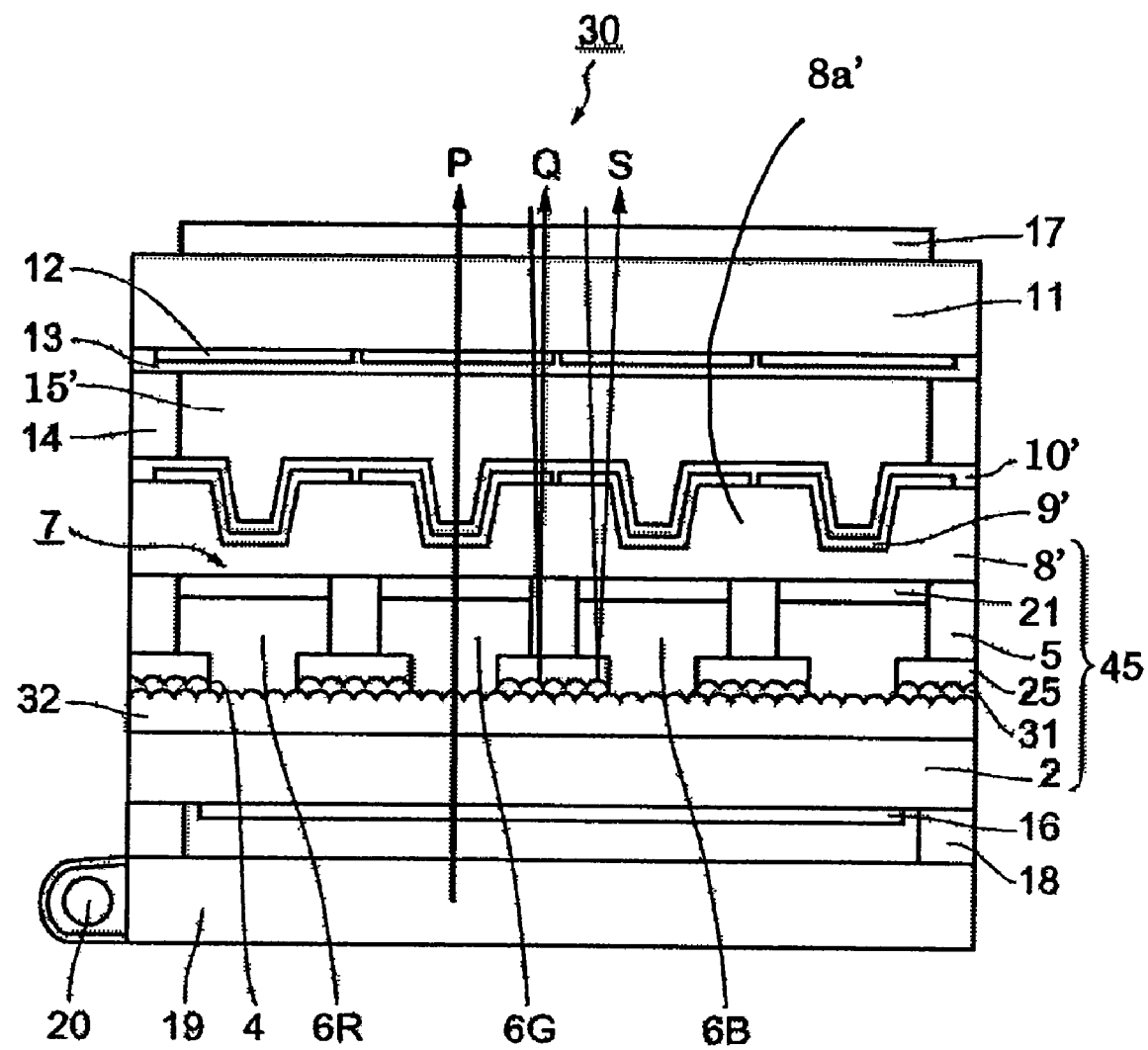
FIG. 4 is a cross sectional view of the semi-transmissive-reflective displaying device according to the second embodiment of the present invention.
Figure 5:
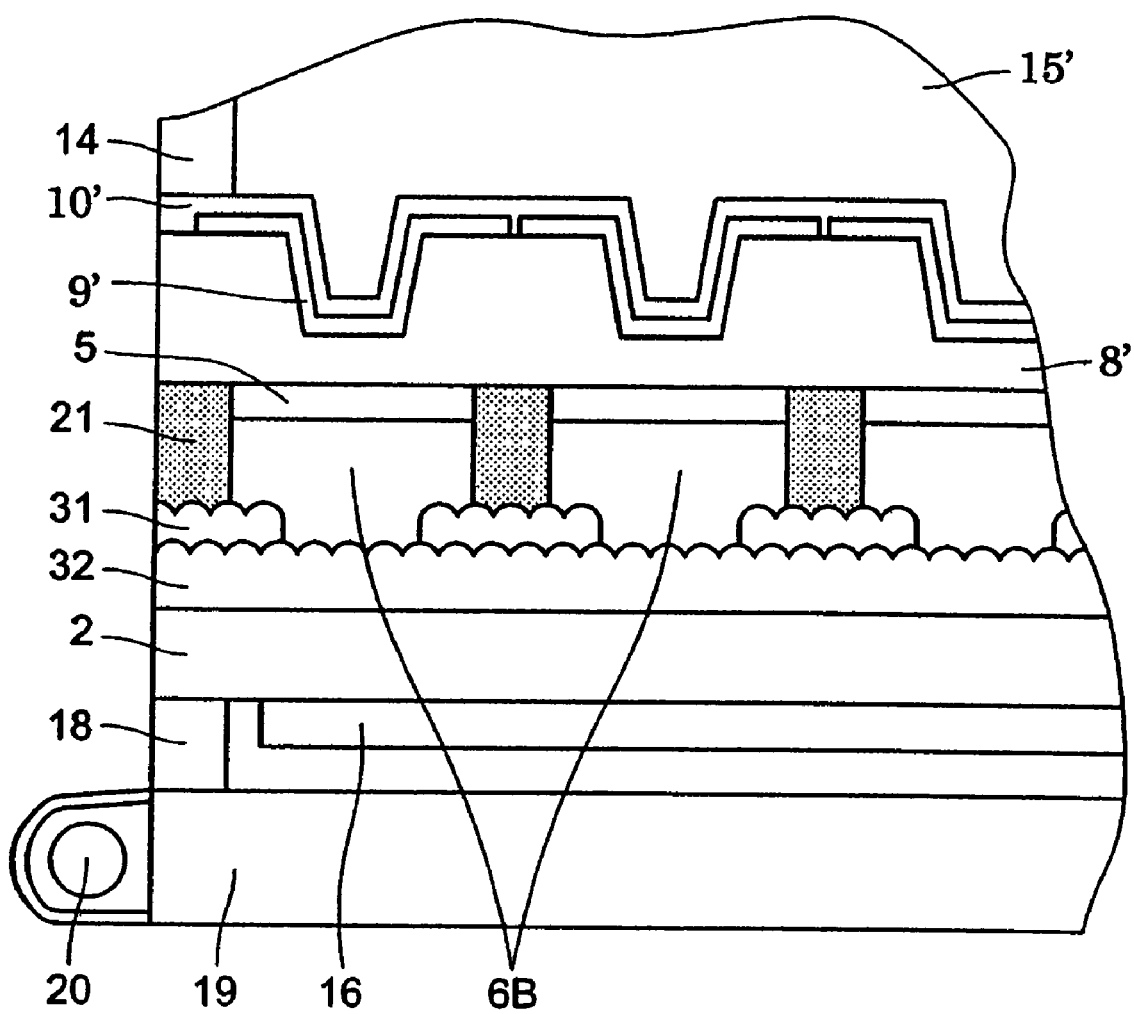
FIG. 5 is an enlarged cross sectional view of the semi-transmissive-reflective displaying device according to the second embodiment of the present invention.

FIG. 4 is a cross-sectional view depicting the semi-light-transmissive reflecting liquid crystal display device 30 in accordance with the second embodiment of the present invention. As in the first embodiment, the side of the liquid crystal 15' on which the light source 20 is disposed is referred to as the back side, and the opposite side as the front side in this cross-sectional view. Also with regard to the arrangement of the boundary layers, a grid is formed with light-transmissive uncolored boundary layers 5 that extend in the direction of the X-axis at a plurality of locations and non-light-transmissive colored boundary layers 21 that extend in the direction of the Y-axis at a plurality of locations as in the first embodiment depicted in FIGS. 2(a) and 2(b). FIG. 4 is a diagram depicting a cross section (I–I') of the uncolored boundary layers 5, while FIG. 5 is a diagram depicting a cross section (III–III') of the colored boundary layers 21. This embodiment differs from the first embodiment in that a resin scattering layer 32 is additionally provided on the back substrate 2, that the reflecting layer 3 is replaced with a scattering and reflecting layer 31 whose front face has an irregular shape, and that the thickness of the overcoat layer 8', is partially changed.

As depicted in FIGS. 4 and 5, the semi-light-transmissive reflecting liquid crystal display device 30 includes a light-transmissive back substrate 2 and a front substrate 11 that are disposed opposite each other, and a color filter 45 for color display purposes. The color filter 45 includes a resin scattering layer 32 which is formed on the front side of the back substrate 2 and has an irregular surface on the front side; a scattering and reflecting layer 31 which has an irregular surface for scattering light and openings 4 formed on its front face; uncolored boundary layers 5 and colored boundary layers 21 which are formed so as to enclose the openings 4 of the scattering and reflecting layer 31; a plurality of deposit portions 7 which is defined by the uncolored boundary layers 5 and the colored boundary layers 21 and to which a prescribed colored fluid is applied by a discharging device to be described later; coloring layers 6R, 6G, and 6B which are formed by depositing colored fluid to the deposit portions 7; and an overcoat layer 8' that is designed to completely cover the uncolored boundary layers 5, the colored boundary layers 21, and the coloring layers 6R, 6G, and 6B, and is formed with different thickness such that portions 8'a of the overcoat layer 8' that are above the scattering and reflecting layer 31 are thicker than other portions of the overcoat layer 8'.

Pixel electrodes 12 disposed corresponding to the coloring layers 6R, 6G, and 6B, and an orientation film 13 for covering the pixel electrodes 12 are provided on the back of the front face substrate 11. Counter electrodes 9' are disposed in a concave tail-like shape opposite the pixel electrodes 12. An orientation film 10' that covers the counter electrodes 9' is provided on the overcoat layer 8' described above. A seal 14 is formed along the external periphery of the front substrate 11 between the orientation films 10' and 13, and liquid crystal 15' is sealed in the space formed between the seal 14 and the orientation films 10' and 13. Also provided are a front-face polarizing plate 17 attached to the front side of the front substrate 11, a back-face polarizing plate 16 attached to the back side of the back substrate 2, an optical waveguide plate 19 provided via a buffer 18 so as to cover the entire back side of the back-face polarizing plate 16, and a light source 20 for supplying light to the optical waveguide plate 19.

The coloring layers 6R, 6G, and 6B are arranged in an orderly fashion in a grid. Coloring layers 6 of the same color form a row in the X-axis direction, while coloring layers 6R, 6G, and 6B of different colors are aligned in the Y-axis direction. The uncolored boundary layers 5 are arranged at the borders between coloring layers 6 of different colors, while the colored boundary layers 21 are arranged at the borders of coloring layers 6 of the same color. The uncolored boundary layers 5, the counter electrodes 9', the pixel electrodes 12, the orientation films 10' and 13, the overcoat layer 8', and the scattering layer 32 are also light-transmissive.

Reflective Display Mode

First, the reflective display mode of the semi-light-transmissive reflecting liquid crystal display device 30 thus configured will be described. Among various external lights that enter the front-face polarizing plate 17, only lights that are in the transmission direction (transmission axis direction), such as external lights Q and S, are allowed to pass through the front-face polarizing plate 17. Once the external lights Q and S have passed through the front-face polarizing plate 17, they further pass through: the pixel electrodes 12→the orientation film 13→the liquid crystal 15'→the orientation film 10'→the counter electrodes 9'→the overcoat layer 8', in this order. The external light S in FIG. 1 then passes through the coloring layer 6B and reaches the scattering and reflecting layer 31. The external light S is then reflected by the scattering and reflecting layer 31 and again passes through the coloring layers 6B. The external light S exits from the front side as colored light that is colored in the color of the coloring layer 6B, after passing through, in a reverse order, the layers from which it entered. On the other hand, after the overcoat layer 8', the external light Q in this arrangement passes through the uncolored boundary layer 5 and reaches the scattering and reflecting layer 31. The external light Q is then reflected by the scattering and reflecting layer 31 and again passes through the uncolored boundary layer 5', eventually exiting from the front side as colorless light after passing through in a reverse order the layers through which it entered.

In this arrangement, the external lights Q and S are scattered in various directions by the irregular surfaces of the scattering and reflecting layers 31 when they are reflected at the scattering and reflecting layers 31. Accordingly, an image from the incoming direction of the light, such as reflection of viewer's eyes, face, or the like that occurs on the display when there is no irregular surface in the reflecting layer is thereby prevented, and a clearer display is obtained. This scattering and reflecting layers 31 are made of a thin film of silver, aluminum, nickel, chrome, or the like to reflect light, and irregularities are provided on its surface by etching, oxygen plasma treatment, or the like to scatter light. Furthermore, although almost no external light that enters the openings 4 is reflected, the front face of a resin scattering layer 32 is provided with irregularities in order to prevent slight reflections and to yield an even clearer display.

The external light S that passes through the coloring layer 6' twice is colored with a prescribed color up to a prescribed color saturation. Accordingly, the external light S has inevitably reduced its brightness, whereas the external light Q that has passed through the uncolored boundary layer 5' without passing through the coloring layers 6 maintains its original brightness. Consequently, in order to increase the brightness of the external light S, the external light Q and the external light S are caused to exit from the front face simultaneously, such that the overall brightness is maintained. The uncolored boundary layers 5 having such effects are preferably made of an acrylic resin or epoxy resin with good light-transmission property and are aligned in an orderly fashion at the boundaries between the coloring layers 6 of differing colors. Accordingly, the overall brightness of the coloring layers 6 is balanced and an easily readable display is obtained. The colored boundary layers 21 formed at the boundaries between coloring layers 6 of the same color are black and enhance a good color contrast. The colored boundary layers 21 also allow a continual discharge of coloring by a deposit discharging device, which will be described later, to form coloring layers 6, because any inadvertent deposit of coloring liquid over the colored boundary layers 21 will not have a detrimental effect on display.

Since green light is more recognizable to human eye than red or blue light, an increase in the area of the uncolored boundary layers 5 with a resultant reduction in the area of the green coloring layer 6G causes no problem in visibility of the display. The increase in the area of the uncolored boundary layer 5 also correspondingly increases the amount of uncolored external light Q, thereby improving the brightness of the display in the reflective display mode. Moreover, as shown in FIG. 4 and FIG. 5, the overcoat layer 8' is formed with a greater thickness at portions 8'a, which face the scattering reflective layers 31. Accordingly, the external lights Q and S that are reflected at the scattering reflective layer 31 travel a shorter passage through the liquid crystal 15. Thus, the brightness of the external lights Q and S that are reflected at the scattering reflective layer 31 can be further maintained. The shortened passage reduces the brightness loss that occurs at the liquid crystal 15 to a minimum, and improves the brightness of light exiting from the front side.

Figure 13:
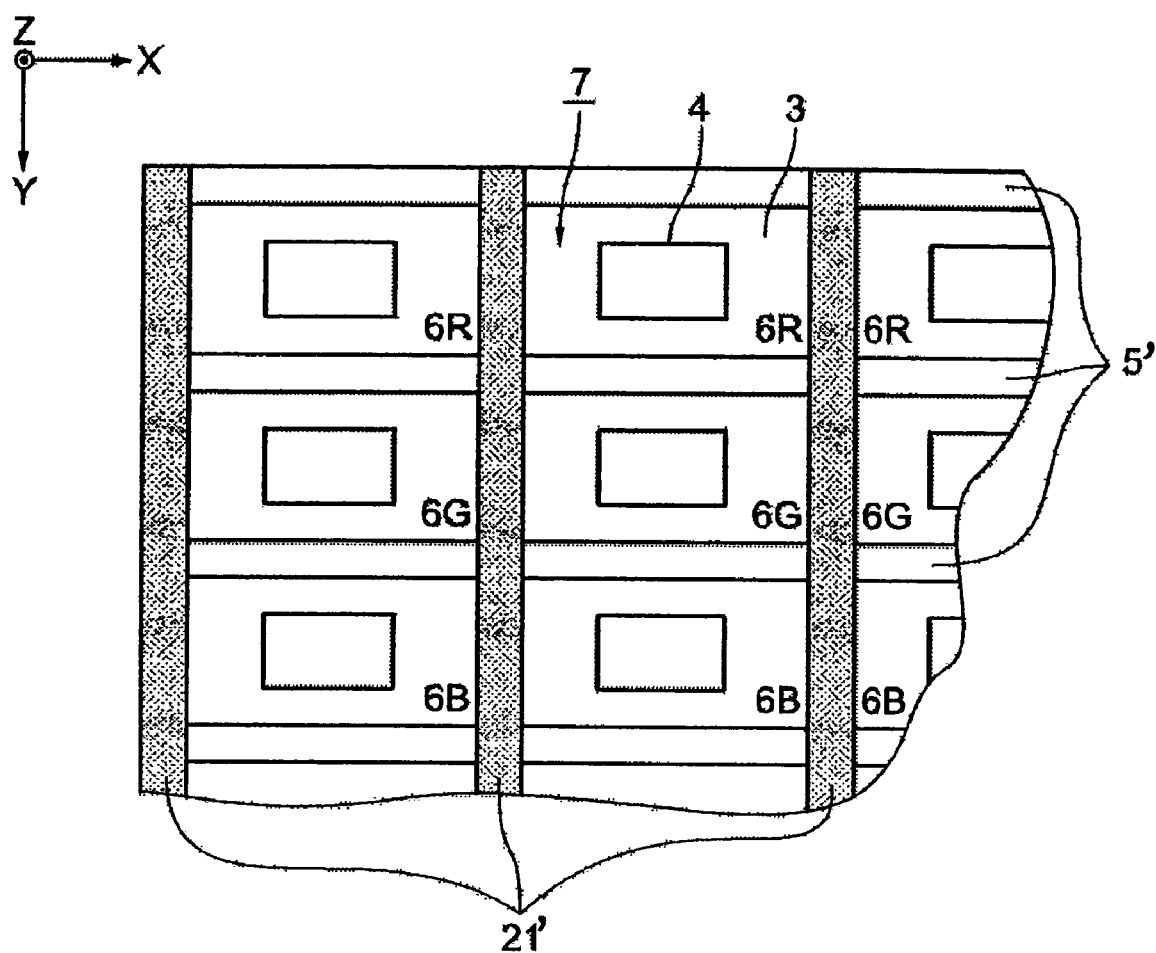
FIG. 13 is a top view of an alternate arrangement of boundary layers in the semi-transmissive-reflective displaying device.

Additionally, the uncolored boundary layers 5 and the colored boundary layers 21 do not necessarily need to be arranged as shown in FIG. 2, wherein the uncolored boundary layers 5 extends continuously along the X-axis and the colored boundary layers 21 extends intermittently along the y-axis. Instead, an arrangement as shown in FIG. 13 may be employed, wherein the colored boundary layers 21' extend continuously along the Y-axis and the uncolored boundary layers 5' extend intermittently along the X-axis.

Transmissive Display Mode

The manner in which the semi-light-transmissive reflecting liquid crystal display device 30 of the present embodiment functions in the transmissive display mode is substantially the same as the foregoing semi-light-transmissive reflecting liquid crystal display device 1 described above. Accordingly, detailed description of the semi-light-transmissive reflecting liquid crystal display device 30 in the transmissive display mode is omitted herein. In the semi-light-transmissive reflecting liquid crystal display device 30 of this embodiment, however, the overcoat layer 8' and the liquid crystal 15' are designed such that the length of the liquid crystal 15' through which the external light Q and S are transmitted is shortened to reduce the amount of reduction in the brightness as described above. Accordingly, if the brightness of the incoming external light Q and S is the same as the brightness of the transmission light P at the light source 20', there will be very little difference in brightness between the transmission light P and the external light Q and S at the time they are emitted from the front face. In other words, the semi-light-transmissive reflecting liquid crystal display device 30 of the present has a good display balance, substantially eliminating the difference in the variance in brightness between the transmission light P and the external lights Q and S.

In the semi-light-transmissive reflecting liquid crystal display devices 1 and 30 described in the first and second embodiments, the coloring layers 6R, 6G, and 6B can be formed uniformly and effectively by depositing droplets of colored fluid onto the deposit portions 7 to with a droplet-discharging device. In this manner, it is possible to form the coloring layers having uniform thickness and coverage. Additionally, the overcoat layer 8 may also be formed with a similar droplet-discharging device.

Structure of Manufacturing Device

Droplet Discharging Device 100

Figure 6:
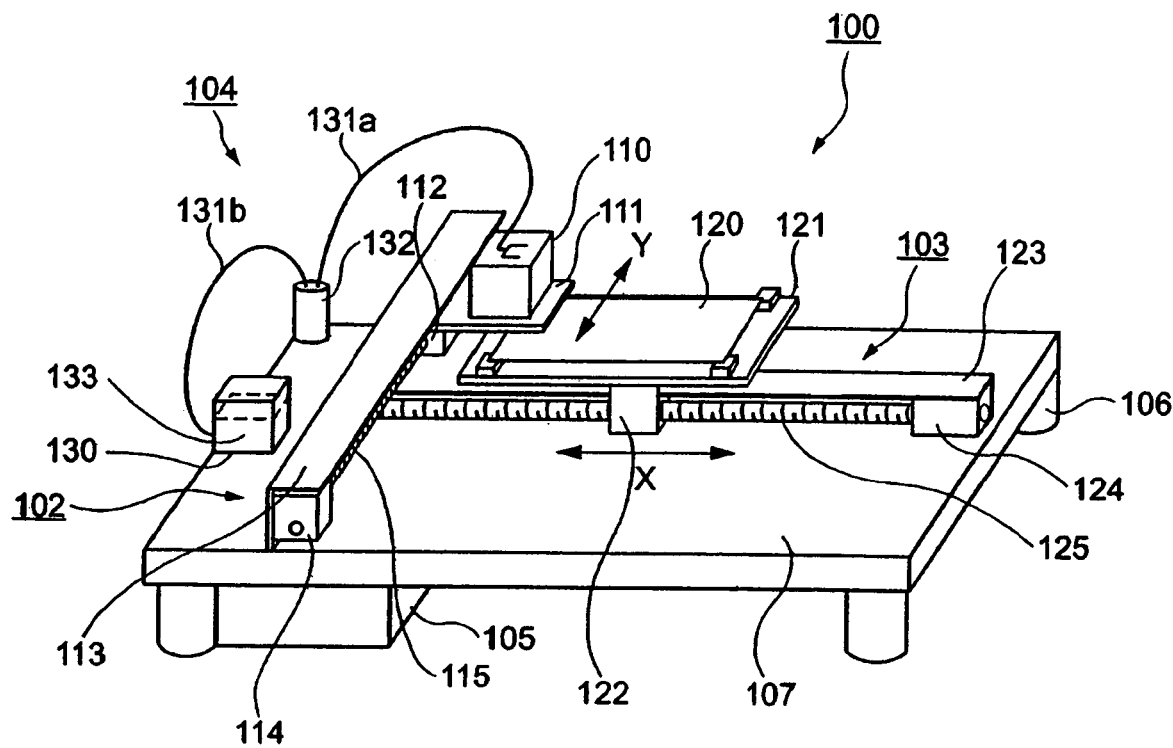
FIG. 6 is an oblique view of the droplet discharging device.

As depicted in FIG. 6, a droplet-discharging device 100 includes a head mechanism 102 having a head unit 110 for discharging droplets; a work mechanism 103 provided with a work 120, which is a discharge target onto which the droplets are discharged from the head unit 110; a fluid feeding unit 104 for feeding fluid 133 to the head unit 110; and a controller 105 for performing overall control of these mechanisms and the feeding unit.

The droplet-discharging device 100 is further provided with a plurality of support legs 106 placed on the floor, and a table 107 attached to the tops of the support legs 106. At the top of the table 107, the work mechanism 103 is disposed so as to extend in the longitudinal direction (X-axis direction) of the table 107. The head mechanism 102 supported by two pillars that are provided on the table 107 is disposed above the work mechanism 103 so as to extend in the direction orthogonal to the work mechanism 103 (in the Y-axis direction). A fluid feeding unit 104 for feeding the fluid 133 is connected from the head unit 110 of the head mechanism 102 and is disposed on one end of the table 107. Furthermore, the controller 105 is accommodated on the underside of the table 107.

The head mechanism 102 is provided with a head unit 110 for discharging the fluid 133, a carriage 111 on which the head unit 110 is mounted, a Y-axis guide 113 for guiding the movement of the carriage 111 in the Y-axis direction, a Y-axis bore screw 115 mounted in the Y-axis direction under the Y-axis guide 113, a Y-axis motor 114 for rotating the Y-axis bore screw 115 forward and backward, and a carriage screwing unit 112 at the bottom of the carriage 111 in which a female screw is formed for engaging with the Y-axis bore screw 115 and moving the carriage 111.

The work mechanism 103 is positioned below the head mechanism 102. The work mechanism 103 has substantially the same structure as the head mechanism 102, except that the work mechanism 103 is disposed in the X-axis direction. The work mechanism 103 includes a mounting platform 121 on which the work 120 is mounted, an X-axis guide 123 for guiding the movement of the mounting platform 121, an X-axis bore screw 125 mounted under the X-axis guide 123, an X-axis motor 124 for rotating the X-axis bore screw 125 forward and backward, and a mounting platform screwing unit 122 at the bottom of the mounting platform 121 for engaging with the X-axis bore screw 125 and moving the mounting platform 121.

Although not illustrated in the Figures, the head mechanism 102 and work mechanism 103 each additionally include a position sensing means, which senses the positions to which the head section 110 and the work table 121 have traveled. The carriage 111 and work table 121 each have a mechanism for adjusting the rotational axis (so-called θ axis) built therein, thereby allowing the adjustment of the rotational axis of work table 121 as well as the adjustment of the rotational axis of the head section 110 about its center.

Due to these configurations, the head unit 110 and the work 120 can be moved back and forth in the Y-axis and X-axis directions. The movement of the head unit 110 will first be described. The Y-axis bore screw 115 is rotated forward and backward by the forward and backward rotation of the Y-axis motor 114, and the carriage 111 that is fixedly attached to the carriage screwing unit 112 can be moved to any position by moving the carriage screwing unit 112 that is threadedly coupled to the Y-axis bore screw 115 along the Y-axis guide 113. In other words, the head unit 110 mounted on the carriage 111 can move freely in the Y-axis direction by driving the Y-axis motor 114. In the same manner, the work 120 mounted on the mounting platform 121 can also move freely in the X-axis direction.

In this manner, the head unit 110 is moved up along the Y-axis to the discharge position and stopped, such that droplets are discharged in synchronism with the movement of the work 120 below along the X-axis direction. Accordingly, a desired pattern can be formed on the work 120 by controlling the work 120, which moves in the X-axis direction, and the head unit 110, which moves in the Y-axis direction, relative to each other.

The fluid feeding unit 104 for feeding the fluid 133 to the head unit 110 is composed of a tube 131a that forms a flow channel to the head unit 110; a pump 132 for pumping fluid to the tube 131a; a tube 131b (flow channel) for feeding the fluid 133 to the pump 132; and a tank 130 for storing the fluid 133. The tank 130 is connected to the tube 131b and is disposed at one end on the table 107. Although it is preferable to mount the tank 130 over or under the table 107 to facilitate refill and exchange of the liquid 133, installing the tank 130 over head section 110 enables feeding of the liquid 133 by connecting the tank 130 and the head section 110 with a single flexible tube.

Figure 7:
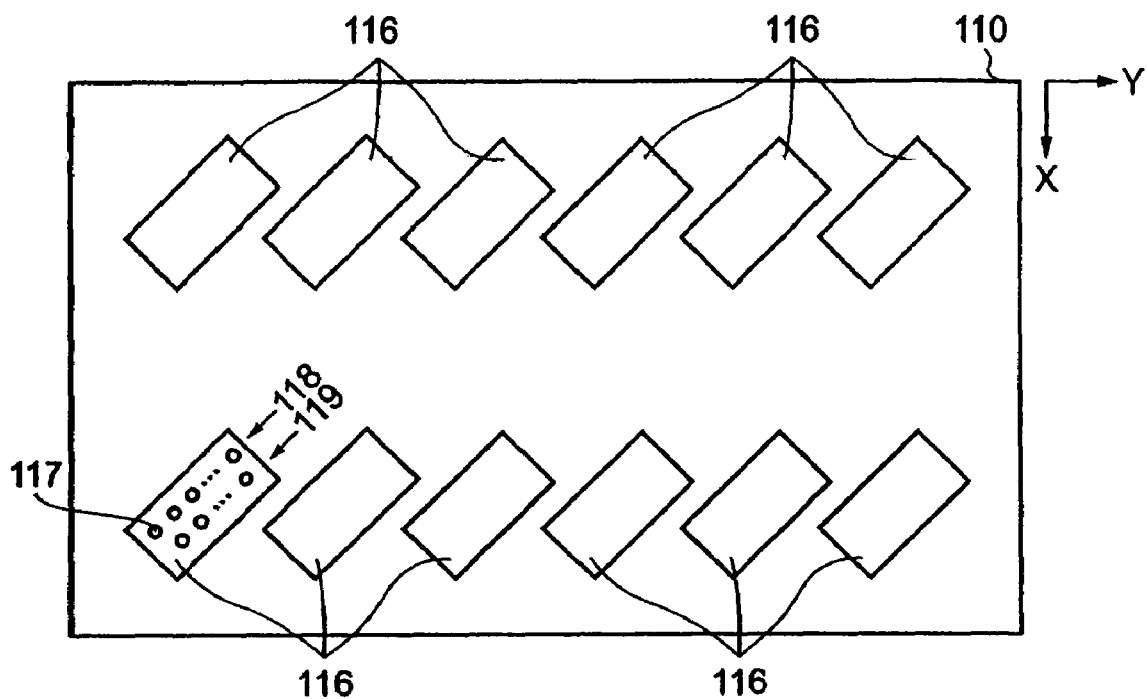
FIG. 7(a) is a top view of the head unit of the droplet discharging device, showing arrangement of heads and nozzles.
FIG. 7(b) is an enlarged oblique view of the discharge heads of the droplet discharging device.
Figure 7:
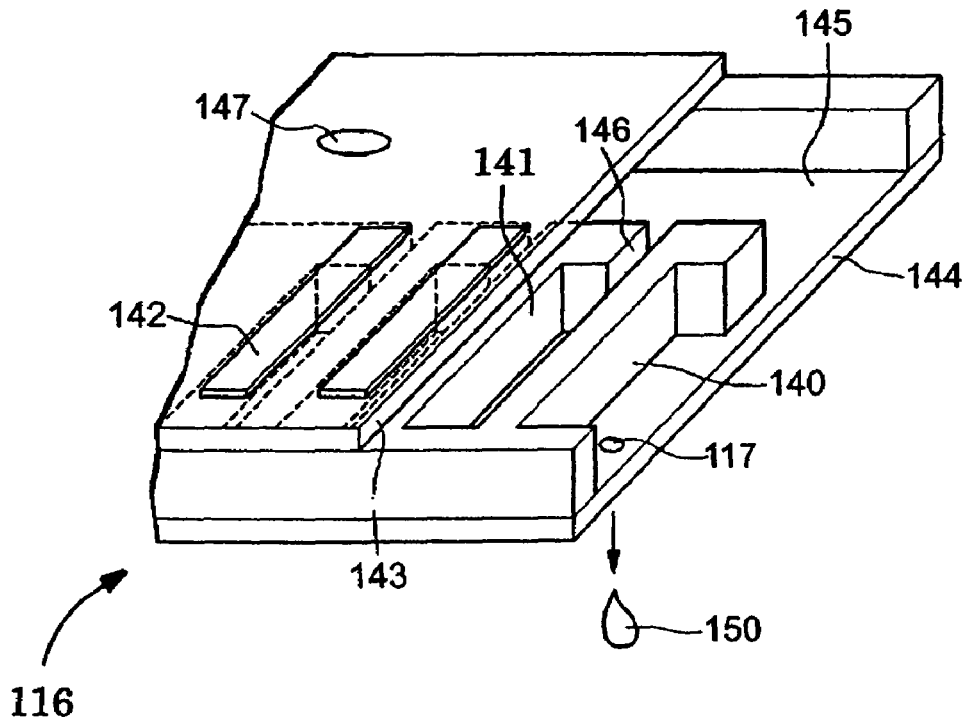

As depicted in FIG. 7(a), the head unit 110 contains a plurality of discharge heads 116 having the identical structure. FIG. 7(a) is a diagram depicting the head unit 110 as viewed from the mounting platform 121. Two rows of six discharge heads 116 are arranged in the head unit 110 such that the longitudinal direction of each of the discharge heads 116 is at an angle with respect to the X-axis direction. Each of the discharge heads 116 that discharge the fluid 133 also has two nozzle rows 118 and 119 extending in the longitudinal direction of the discharge head 116. Each of the nozzle rows 118 and 119 has 180 nozzles 117 lined up in a row, and the interval between the nozzles 117 along the direction of the nozzle rows 118 and 119 is approximately 140 μm. The nozzles 117 between the two nozzle rows 118 and 119 are arranged so as to be offset by a half-pitch (approximately 70 μm).

As depicted in FIG. 7(b), each of the discharge heads 116 is provided with a diaphragm 143 and a nozzle plate 144. A fluid reservoir 145 that is continually filled with the fluid 133 fed from the tank 130 via a hole 147 is positioned between the diaphragm 143 and the nozzle plate 144. A plurality of barriers 141 are also positioned in the space between the diaphragm 143 and the nozzle plate 144. The area enclosed by the diaphragm 143, the nozzle plate 144, and a pair of barriers 141 constitutes a cavity 140. The cavity 140 is provided for each of the nozzles 117, so the number of cavities 140 is the same as the number of nozzles 117. The fluid 133 is fed to the cavities 140 from the fluid reservoir 145 via a feeding port 146 positioned between the pair of barriers 141.

As depicted in Figure and 8, a transducer 142 is positioned opposite each of the cavities 140 on the diaphragm 143. The transducer 142 is composed of a piezoelement 142c and a pair of electrodes 142a and 142b that sandwich the piezoelement 142c. The fluid 133 is formed into droplets 150 and discharged from corresponding nozzles 117 as a drive voltage is applied to the pair of electrodes 142a and 142b. In the case of the semi-light-transmissive reflecting liquid crystal display devices 1 and 30 discussed above, the droplets 150 of colored fluid are discharged onto the deposit portions 7 enclosed by the colorless and colored boundary layers 5 and 21, thereby creating the coloring layers 6R, 6G, and 6B.

Figure 10:
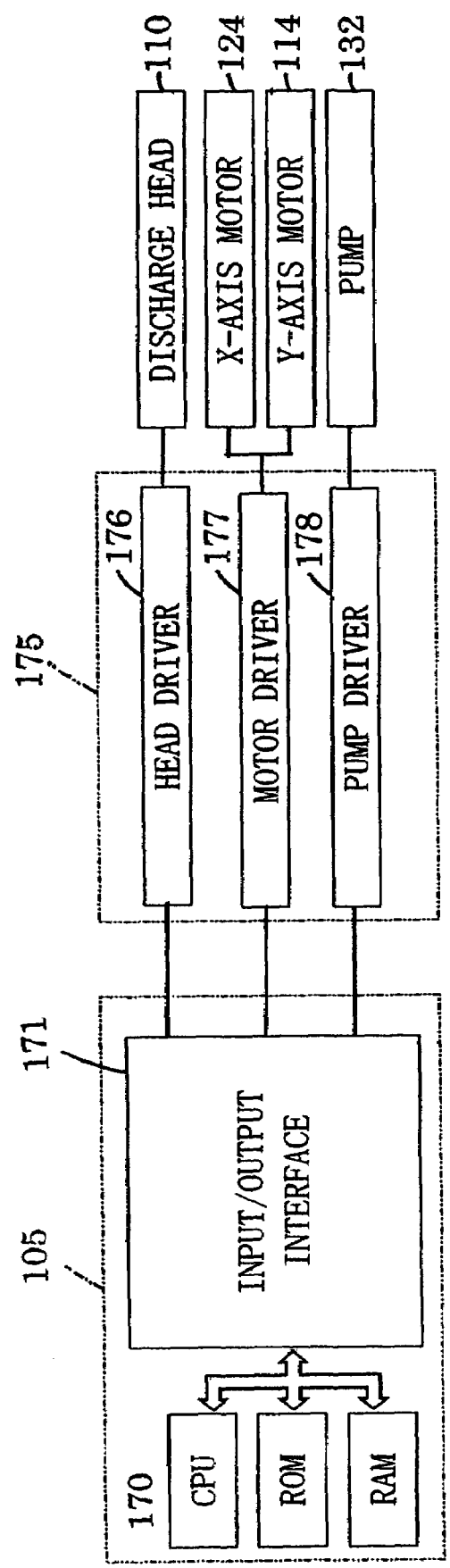
FIG. 10 is a block diagram of the control system of the droplet discharging device.

The control system for controlling the configuration described above will next be described with reference to FIG. 10. The control system is provided with a controller 105 and a drive unit 175. The controller 105 is composed of a CPU 170, a ROM, a RAM, and an input/output interface 171. The CPU 170 processes various signals inputted via the input/output interface 171 based on data in the ROM and RAM, outputs a control signal to the drive unit 175 via the input/output interface 171, and selectively controls each component operatively connected to the control system. It will be apparent to those skilled in the art from this disclosure that the precise structure and algorithms for controller 105 can be any combination of hardware and software that will carry out the functions of the present invention.

The drive unit 175 is composed of a head driver 176, a motor driver 177, and a pump driver 178. The motor driver 177 rotates the X-axis motor 124 and the Y-axis motor 114 through the control signal of the controller 105, to control forward and backward movement of the work 120 and the head unit 110. The head driver 176 controls discharge of the fluid 133 from the discharge heads 116 while synchronizing with the control of the motor driver 177, such that a desired pattern can be formed on the work 120. The pump driver 178 controls the pump 132 in coordination with the discharge state of the fluid 133 and optimally controls the fluid supply to the discharge heads 116.

The controller 105 is configured to send a separate signal to each of the plurality of transducers 142 via the head driver 176. The volume of droplets 150 to be discharged from the nozzles 117 is thereby controlled for each of the nozzles 117 according to the signal from the head driver 176. Furthermore, the volume of droplets 150 discharged by each of the nozzles 117 can be varied between 0 pL and 42 pL (pico liters).

Manufacturing Methods of Color Filter 40

Manufacturing Method of Color Filter 40

Figure 11:
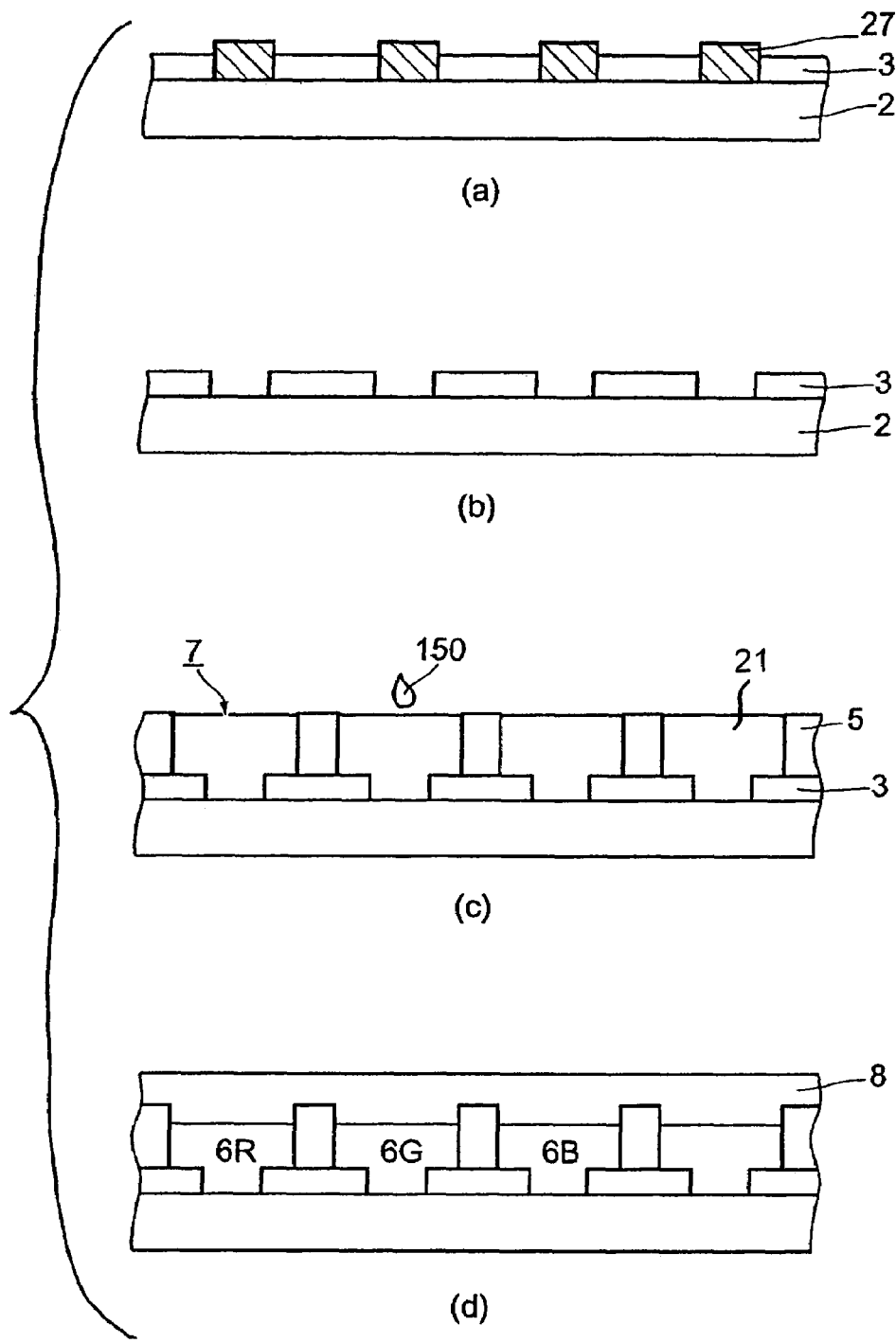
FIG. 11 are schematic views showing a process of manufacturing the color filter substrate according to the first embodiment of the present invention.

The manufacturing method of the color filter 40 in accordance with the first embodiment will be described in detail with reference to FIG. 11. The color filter 40 includes the back substrate 2, the reflecting layer 3, the openings 4, the uncolored boundary layer 5, the colored boundary layer 21, the deposit portions 7, the coloring layers 6R, 6G, and 6B, and the overcoat layer 8. First, as depicted in FIG. 11(a), an organic resist film 27 for forming the openings 4 is formed on the front face of the back substrate 2, and an aluminum, chrome, or other metallic thin film for forming the reflecting layer 3 is formed thereon by vapor deposition or the like. The metallic thin film is bonded to the back substrate 2, but is not bonded to the resist film 27. The resist film 27 and the metallic thin film on the resist film 27 are removed by a solvent after the metallic thin film is formed, whereupon the reflecting layer 3 is formed as depicted in FIG. 11(b). The uncolored boundary layer 5 composed of an acrylic or other light-transmissive resin, and the colored boundary layer 21 composed of a black resin form a grid as depicted in FIGS. 2(a) and 2(b) on the reflecting layer 3, by screen printing or the like. Accordingly, the deposit portions 7 that are enclosed by the back substrate 2, the reflecting layers 3, the uncolored boundary layer 5, and the colored boundary layer 21 are formed as depicted in FIG. 11(c).

Figure 8:
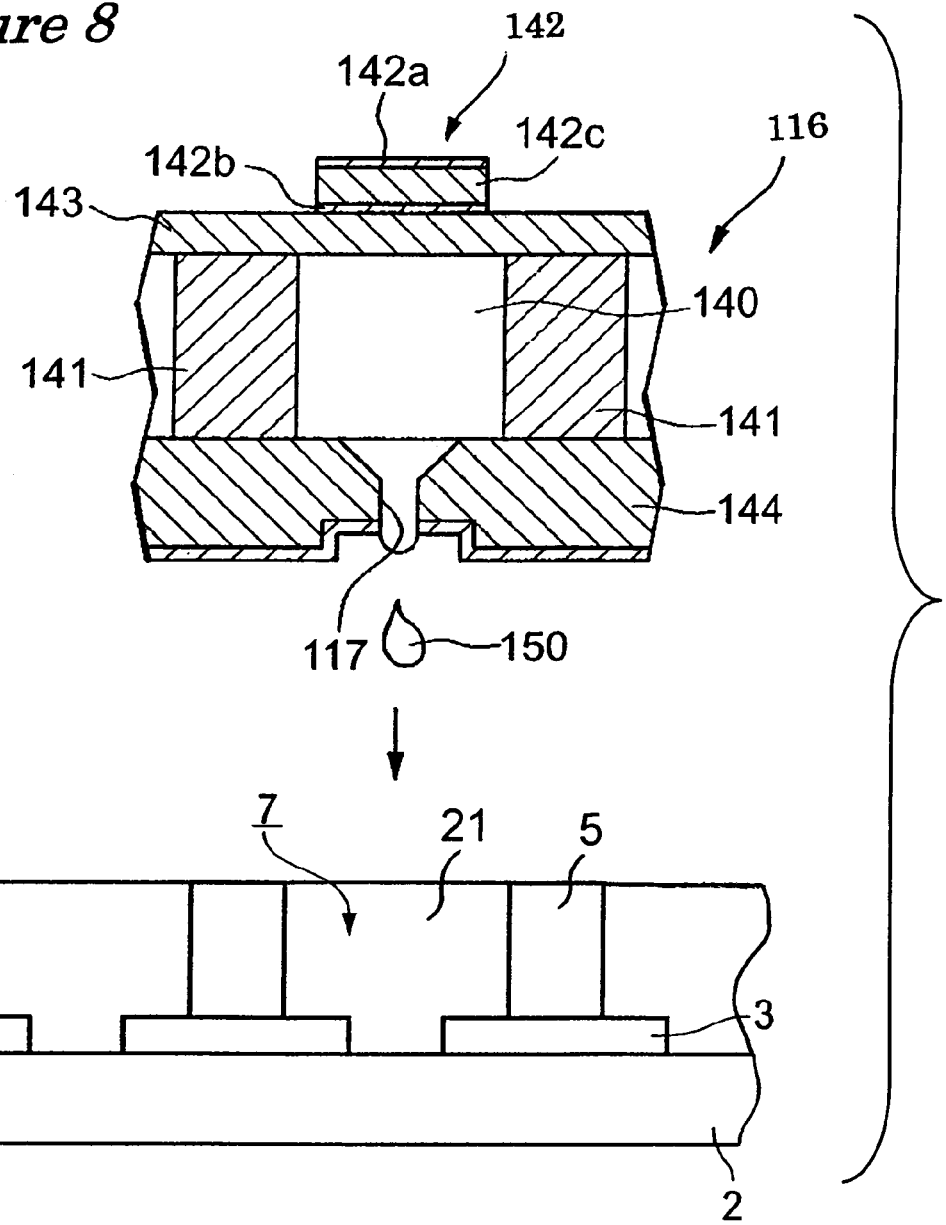
FIG. 8 is a cross sectional view of the discharge head discharging a droplet to the deposit portion.

The method whereby the droplets 150 of colored fluid are discharged by the droplet-discharging device 100 onto the deposit portions 7 to form the coloring layer 6 will be described using an example whereby red colored fluid is discharged to form a coloring layer 6R. First, the back substrate 2 on which the reflecting layer 3, the uncolored boundary layer 5, and the colored boundary layer 21 are formed is mounted on the mounting platform 121 as the work 120, such that the direction in which the uncolored boundary layer 5 extends is the X-axis and the direction in which the colored boundary layer 21 extends is the Y-axis, as depicted in FIGS. 2(a) and 2(b). Droplets 150 of red colored fluid are discharged from the nozzle 117 as depicted in FIG. 8. The discharge head 116 moves in the X-axis direction from one end to the other end and deposit droplets 150 one by one to each of the deposit portions 7 of the red coloring layers 6R that are lined up in the X-axis direction. It is also possible to simultaneously deposit droplets 150 from another nozzle 117 to deposit portions 7 of another row of red coloring layer 6R. A red coloring layer 6R is completed by repeating this operation a number of times. The number of times this operation needs to be repeated depends on the number of rows of deposit portions 7 of the red coloring layers 6R.

In this case, the boundaries between the red coloring layers 6R are the non-light-transmissive colored boundary layers 21 extending in the Y-axis direction. Thus, there is no effect on the performance of the display device even if droplets 150 land on the colored boundary layer 21. Therefore, discharge of droplets in the X-axis direction can be performed continuously and efficiently without having to deposit intermittently to avoid the colored boundary layer 21. Particularly, the four corners of the coloring layer 6R, which is rectangular in shape as shown in FIGS. 2(a) and 2(b), are difficult areas for the droplets 150 to fill. If droplets 150 are placed in the coloring layer 6R in a manner of avoiding the landing of droplets 150 on the boundary layers 5 and 21, droplets 150 will be placed only in the center of coloring layer 6R. In such cases, filling of the corners of coloring layer 6R with the droplets 150 will be difficult. In contrast, by placing the droplets 150 in such a manner as to allow the droplets 150 to land near the corners of colored boundary layer 21, it is possible to effectively fill the corners of the coloring layer 6R with the droplets 150 and achieve uniform formation of all coloring layers 6. On the other hand, the boundaries between the green coloring layers 6G and the adjacent blue coloring layers 6B are the uncolored boundary layers 5, so droplets 150 must be prevented from landing thereon. However, since the uncolored boundary layers 5 are parallel to the X-axis, and the nozzles 117 move only in the X-axis direction, it is easy to prevent the nozzles 117 and the uncolored boundary layers 5 from intersecting. In a conventional arrangement, where an uncolored portion is provided inside each of the deposit portions 7 and is made to perform the functions of the uncolored boundary layer 5 of the present invention, discharge of droplets had to avoid the uncolored portion at every discharge of droplets 150 to the deposit portions 7. Accordingly, it was difficult to control discharge of droplets. The arrangement of the uncolored boundary layers 5 of the present invention in this manner facilitates the depositing process of the droplets.

The aforementioned method of manufacturing the red coloring layer 6R also applies to manufacturing method of the blue and green coloring layers 6G and 6B. After the coloring layers 6R, 6G, and 6B are formed as described above, the overcoat layer 8 is provided so as to cover the coloring layers 6R, 6G, and 6B, the uncolored boundary layer 5, and the colored boundary layer 21. In this manner, manufacturing of the color filter 40 is thus completed.

Manufacturing Method of Color Filter 45

The manufacturing method of the color filter 45 of the second embodiment is basically the same as that of the color filter 40 of the first embodiment. Therefore, only the main differences between the two methods will be described. A light-transmissive resin scattering layer 32 provided with an irregular front face is affixed over the entire front side of the back substrate 2, and a resist film 27 and a scattering and reflecting layer 31 are formed on the resin scattering layer 32. The scattering and reflecting layer 31 in this embodiment is a metallic thin film, and is therefore formed so as to follow concavities and convexities of the surface of the resin scattering layer 32. Additionally, further irregularity is provided to the surface of the scattering and reflecting layer 31 by oxygen plasma treatment or the like to enhance its scattering effects. The process of removing the resist film 27 from the substrate 2 and subsequent processes are substantially identical to those of the manufacturing method of the color filter 40 in accordance with the first embodiment. Therefore, detailed description of these processes will be omitted herein.

Manufacturing Apparatus 200

Figure 9:
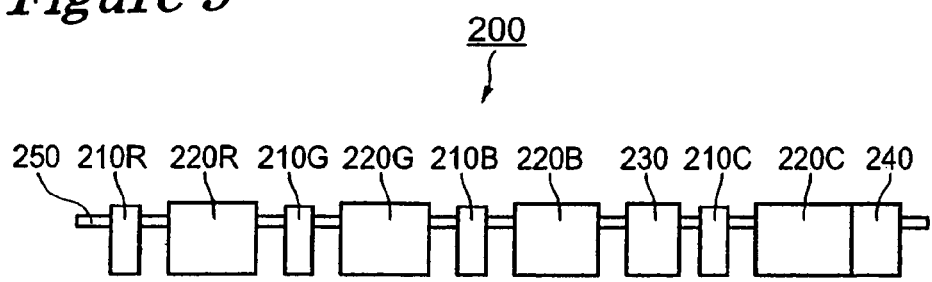
FIG. 9 is a schematic view of the manufacturing apparatus for manufacturing the liquid crystal display device.

An explanation follows for manufacturing apparatus that will be useful in forming coloring layers 6R, 6G and 6B efficiently using droplet-discharging device droplet 100. The manufacturing apparatus 200, which his for manufacturing the semi-light-transmissive reflecting liquid crystal display devices 1 and 30 and depicted in FIG. 9, is a group of devices that includes the droplet-discharging device 100 of the third embodiment for discharging the droplets 150 of a corresponding colored fluid to each of the coloring layers 6R, 6G, and 6B in FIGS. 1 and 4. The manufacturing apparatus 200 is provided with a discharging device 210R for applying red colored fluid to all of the coloring layers 6R to which red colored fluid needs to be applied; a drying device 220R for drying the colored fluid of the coloring layers 6R; a discharging device 210G for applying green colored fluid to all of the coloring layers 6G to which green colored fluid needs to be applied; a drying device 220G for drying the colored fluid of the coloring layers 6G; a discharging device 210B for similarly applying blue colored fluid to all of the coloring layers 6B to which blue colored fluid needs applied; a drying device 220B for drying the blue colored fluid of the coloring layers 6B; an oven 230 for reheating (post-baking) the colored fluids of each color; a discharging device 210C for providing the overcoat layer 8 on the post-baked layer of colored fluid; a drying device 220C for drying the overcoat layer 8; and a curing device 240 for reheating and curing the dried overcoat layer 8. The manufacturing apparatus 200 is further provided with a transport device 250 for transporting the coloring layers 6R, 6G, and 6B through: the discharging device 210R, the drying device 220R, the discharging device 210G, the drying device 220G, the discharging device 210B, the drying device 220B, the oven 230, the discharging device 210C, the drying device 220C, and the curing device 240, in this order.

The same droplet-discharging device 100 may be utilized as the discharging device 210R, the discharging device 210G, the discharging device 210B, and as the discharging device 210C. In this case, the head unit 110 of the droplet-discharging device 100 may be configured to discharge through the discharge heads 116 droplets of one of the colored fluid of red (R), green (G), and blue (B) or the overcoat. For example, the droplet-discharging device 100 performs the function of the discharging device 210R of the manufacturing apparatus 200 to manufacture the red coloring layer 6R by filling the discharge heads 116 with red colored fluid. The droplet-discharging device 100 performs the function of the discharging device 210G of the manufacturing apparatus 200 to manufacture the green coloring layer 6G by filling the discharge heads 116 with green colored fluid. The droplet-discharging device 100 also performs the function of the discharging device 210B or the discharging device 210C of the manufacturing apparatus 200 to manufacture the blue coloring layer 6B or the overcoat layer 8 by filling the discharge heads 116 with blue colored fluid or overcoat fluid.

Furthermore, manufacturing apparatus 200 can also have devices for forming uncolored boundary layers 5 and colored boundary layers 21, devices for forming the orientation films 10 and 13 of the semi-light-transmissive reflecting liquid crystal display devices 1 and 30, and a device for applying the liquid crystal 15. The uncolored boundary layers 5 and colored boundary layers 21 of the color filters 40 and 45, which are formed with a dispenser or by screen printing, and the orientation films 10 and 13 of the semi-light-transmissive reflecting liquid crystal display devices 1 and 30 can be formed, and the liquid crystal 15 can be applied with the same droplet-discharging device 100.

Manufacturing Method of Semi-Light-Transmissive Reflecting Liquid Crystal Display The manufacturing method for the semi-light-transmissive reflecting liquid crystal display devices 1 and 30, on which the color filter 40 or 45 of the first or second embodiment are mounted as described in the foregoing, will be described using the semi-light-transmissive reflecting liquid crystal display device 1 of FIG. 1 as an example. First of all, the color filter 40 that includes the back substrate 2, the reflecting layer 3, openings 4, the uncolored boundary layer 5, the colored boundary layer 21, the deposit portion 7, the coloring layers 6R, 6G, and 6B, and the overcoat layer 8 is provided. Then, counter electrodes 9 composed of light-transmissive ITO (indium tin oxide) are formed on the overcoat layer 8 of the color filter 40 so as to correspond to each of the coloring layers 6. Furthermore, an orientation film 10 made of polyimide or the like is formed covering the entire surface of the counter electrodes 9 and the overcoat layer 8. This way, the back substrate side of the semi-light-transmissive reflecting liquid crystal display device is completed.

On the other hand, pixel electrodes 12 composed of the same ITO as the counter electrodes 9 and arranged in positions opposite the counter electrodes 9 are formed on the back side of the front substrate 11. An orientation film 13 made of polyimide or the like is formed covering the entire surface of the pixel electrodes 12 and the front substrate 11 to provide a finish to the front substrate 17. A rectangular seal 14 having a notch in a portion thereof and defining areas in which the liquid crystal 15 is to be disposed is formed by screen printing or the like on the orientation film 10. The liquid crystal 15 that is maintained at a temperature suitable for discharge is discharged from the nozzles 117 of the discharge heads 116 to the inside of the seal 14 by using the droplet-discharging device 100. After the liquid crystal 15 is filled, the surface of the orientation film 13 of the front substrate 11 is bonded to the seal 14, and the notch of the seal 14 is sealed after the liquid crystal leaking from the notch is removed. The liquid crystal 15 to be deposited at this time is preferably 100% to 110% of the volume of the liquid crystal area so that gaps do not form in the liquid crystal area or an extra leakage does not occur.

The front-face polarizing plate 17 and back-face polarizing plate 16 are then bonded to the front substrate 11 and the back substrate 2, respectively. A buffer 18 is further provided on the periphery of the back-face polarizing plate 16. An optical waveguide plate 19 is affixed to the buffer 18 so as to face the entire surface of the back-face polarizing plate 16. A light source 20 is then disposed so as to be directly connected with the optical waveguide plate 19. A semi-light-transmissive reflecting liquid crystal display device 1 having excellent color contrast is thus manufactured. The same manufacturing process is performed for the semi-light-transmissive reflecting liquid crystal display device 30, which further includes the resin scattering layer 32.

Third Embodiment

Figure 12:
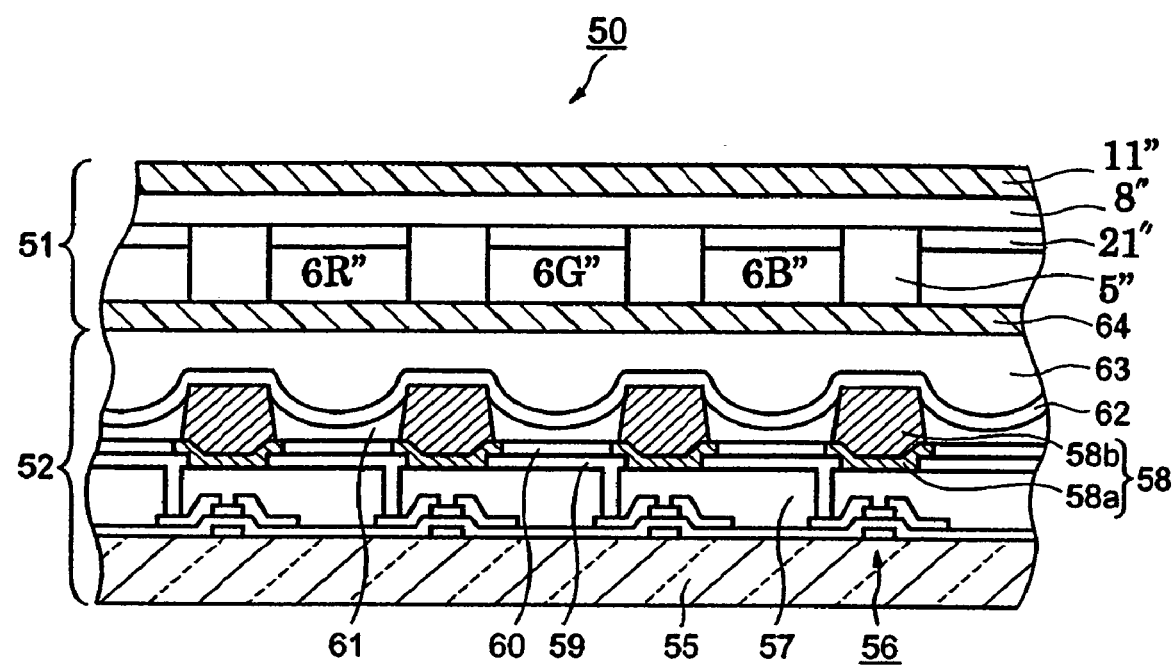
FIG. 12 is a cross-sectional view of the electro-optical device in accordance with the third embodiment of the present invention.

An electro-optical device in accordance with another embodiment of the present invention will be briefly described. The electro-optical device of the present embodiment is a display device in which a color filter provided with light-transmissive uncolored boundary layers 5 is combined with an organic EL (electroluminescence) element for emitting white light. As depicted in FIG. 12, this electro-optical device 50 is composed of a color filter unit 51 and an organic EL unit 52.

The color filter unit 51 is composed of a front substrate 11"; a shared substrate 64 disposed opposite the front substrate 11"; a uncolored boundary layer 5" formed on the front substrate 11" side of the shared substrate 64; red, green, and blue coloring layers 6R", 6G", and 6B"; an uncolored boundary layer 5"; a colored boundary layer 21"; and an overcoat layer 8" for covering the coloring layers 6R", 6G", and 6B".

The organic EL unit 52 is composed of an EL substrate 55, a plurality of switching elements 56 formed on the EL substrate 55; an insulating film 57 formed on the switching elements 56, a plurality of EL pixel electrodes 59 formed on the insulating film 57, banks 58 composed of inorganic banks 58a and organic banks 58b formed between the plurality of EL pixel electrodes 59, a positive-hole transport layer 60 formed on the EL pixel electrodes 59, a white luminescent layer 61 formed on the positive-hole transport layer 60, and an EL counter electrode 62 provided so as to cover the luminescent layer 61 and the banks 58. Furthermore, the shared substrate 64 of the color filter unit 51 attached at the periphery of the EL substrate 55 is arranged on the EL counter electrode 62. Furthermore, an inert gas 63 is enclosed between the shared substrate 64 and the EL counter electrode 62, thus constituting the electro-optical device 50.

The EL substrate 55, the shared substrate 64, and the front substrate 11" in the electro-optical device 50 thus configured are light-transmissive glass substrates. For example, the coloring layers 6R", 6G", and 6B" of the color filter unit 51 are preferably arranged in a grid as depicted in FIGS. 2(*a*) and 2(*b*). The luminescent layers 61, the EL pixel electrodes 59, the positive-hole transport layers 60, and the EL counter electrodes 62 of the organic EL unit 52 are arranged opposite each of the coloring layers 6. The positive-hole transport layer 60 is positioned between the EL pixel electrodes 59 and the luminescent layer 61, and is designed to raise the efficiency of light emission by the luminescent layer 61. The EL pixel electrodes 59 and EL counter electrodes 62 may, for example, be light-transmissive ITO electrodes that are electrically connected to the switching elements 56 and that control the luminescence of the luminescent layer 61. The luminescent layer 61 emits white light. This white light is colored by one of the red, green, and blue coloring layers 6", and exits from the front substrate 11" as colored light. In other words, the organic EL unit 52 acts as a designated light source for each coloring layer 6R", 6G", and 6B".

The positive-hole transport layer 60 and luminescent layer 61, which are essential components of the organic EL unit 52, can be efficiently formed by the droplet-discharging device 100. First, the EL substrate 55, on which the switching elements 56, insulating film 57, EL pixel electrodes 59, and banks 58 are formed, is mounted on the mounting platform 121 as the work 120 as shown in FIG. 6. The X-axis direction and Y-axis direction of the mounting direction are determined so as to correspond with those of the coloring layers 6R", 6G", and 6B" depicted in FIGS. 2(*a*) and 2(*b*). Droplets of material for forming the positive-hole transport layer 60 are discharged from the nozzles 117 while the discharge heads 116 move in the X-axis direction. Accordingly, droplets are deposited one by one to concave portions that are defined by the banks 58 and the EL pixel electrodes 59 and are lined up in the X-axis direction. The manufacture of the positive-hole transport layer 60 is completed by repeating this relative movement several times, depending on the positioning of the nozzles 117 and the number of rows of the concave portions in the Y-axis direction. After the droplets of materials for forming the positive-hole transport layer 60 are dried, droplets of an EL luminescent material are discharged onto the positive-hole transport layer 60. Accordingly, a luminescent layer 61 is formed in the same manner as the positive-hole transport layer 60. After the process involving the droplet-discharging device 100 is completed, the luminescent layer 61 is dried and the EL counter electrode 62 is formed. The luminescent layer 61 and the EL counter electrode 62 are bonded together such that the coloring layers 6" of the color filter unit 51 match the luminescent layer 61 of the organic EL unit 52. Lastly, an inert gas 63 is filled into the space between the EL counter electrode 62 and the shared substrate 64.

With this electro-optical device 50, the luminescent layers 61 of the organic EL unit 52 are arranged opposite the coloring layers 6R", 6G", and 6B" of the color filter unit 51, such that luminescent layers 61 emit light only when their corresponding coloring layers 6" are of a color that needs to be displayed. Accordingly, it is possible to obtain an extremely low power-type display device. With the uncolored boundary layers 5" of the color filter unit 51, colorless bright light exits from the front substrate 11", and the overall display is brightened and made easier to see. The organic EL unit 52 may also include an electronic emission element FED (Field Emission Display) and a SED (Surface Conduction Electron Emitter Display).

Fourth Embodiment

An explanation will now be given to a color filter substrate in accordance with the present invention, along with an electro-optical device in which the color filter substrate of the present invention is utilized. The explanation that follows is with regard to an active matrix type liquid crystal device, which is a liquid crystal device of a semi-transmissive-reflective type, as an example. It should be clear to those skilled in the art that the present invention is not limited to any the embodiments given herein.

Figure 17:
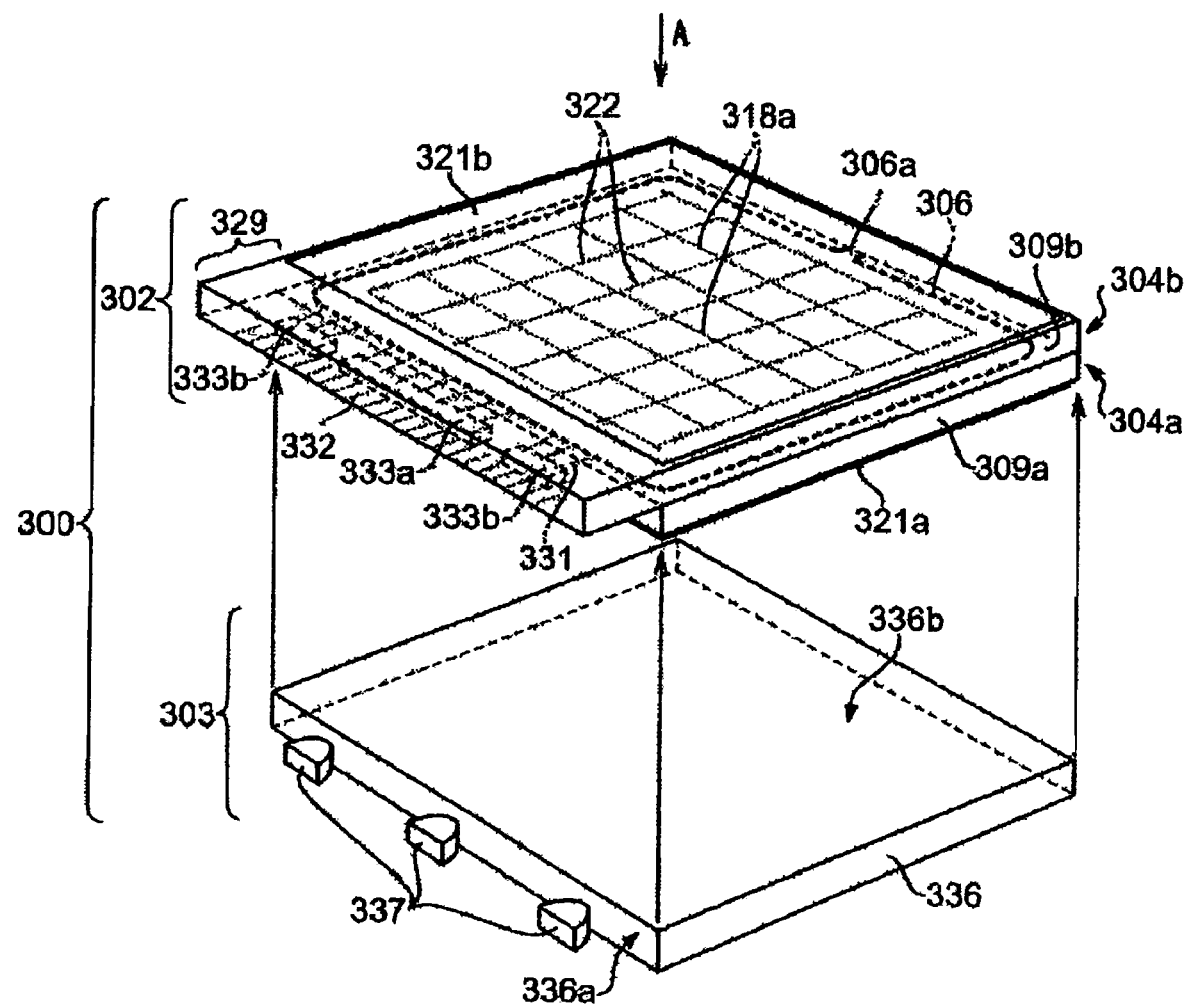
FIG. 17 is an oblique view of the liquid crystal device or the electro-optical device according to the fourth embodiment of the present invention.
Figure 18:
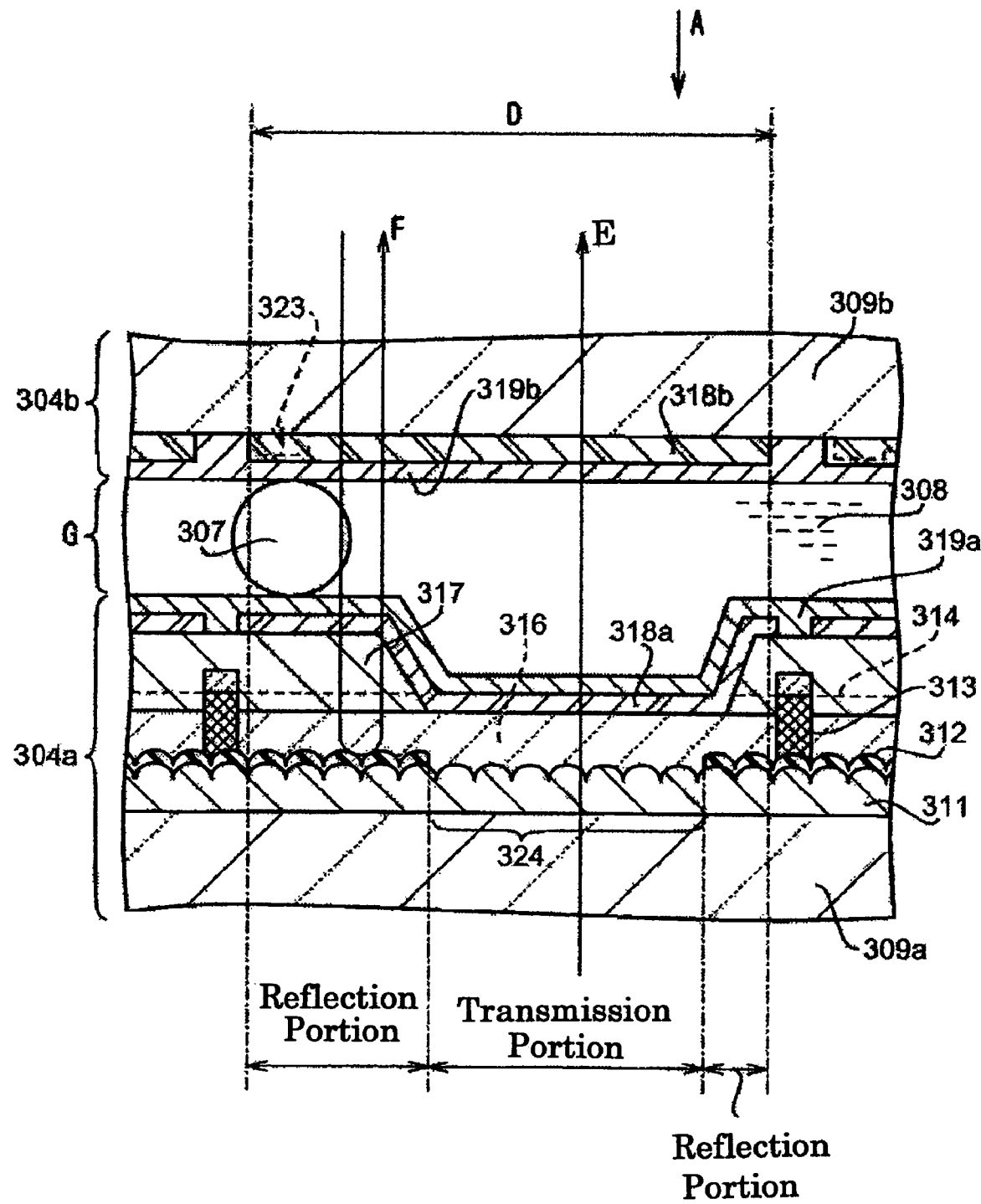
FIG. 18 is an enlarged view of one display dot region in the liquid crystal device according to the fourth embodiment of the present invention shown in FIG. 17.

Referring to FIG. 17, a liquid crystal device 300, which is an example of an electro-optical device, includes a liquid crystal panel 302 and an illuminating device 303. The liquid crystal panel 302 is formed by bonding a first substrate 304*a* and a second substrate 304*b* together with an annular sealing member 306. The sealing 306 has a ring-like shape when viewed from the direction of arrow A in FIG. 17. The first substrate 304*a* is a color filter substrate whereon a color filter is to be formed. The second substrate 304*b* is an element substrate whereon a TFD (Thin Film Detector) element is to be formed. FIG. 18 shows a magnified view of one of the displayed dot sections in the liquid crystal panel 302 of FIG. 17. As shown in FIG. 18, a gap, a so-called cell gap G, is formed between the first substrate 304*a* and the second substrate 304*b* and maintained by a spacer 307. The liquid crystal fills the cell gap G to form a liquid crystal layer 308.

Figure 14:
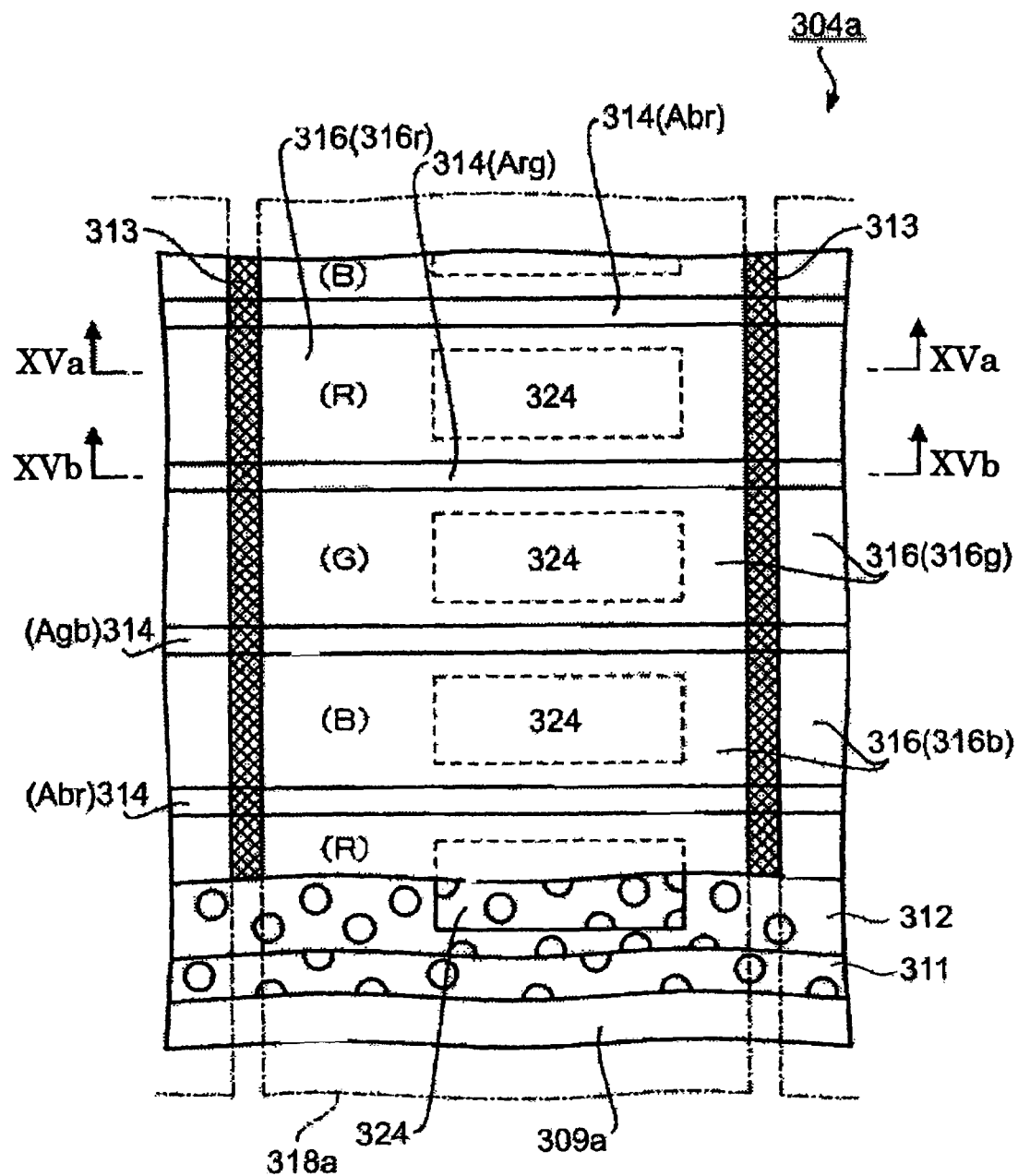
FIG. 14 is a top view of one pixel section of the color filter substrate according to the fourth embodiment of the present invention.
Figure 15:
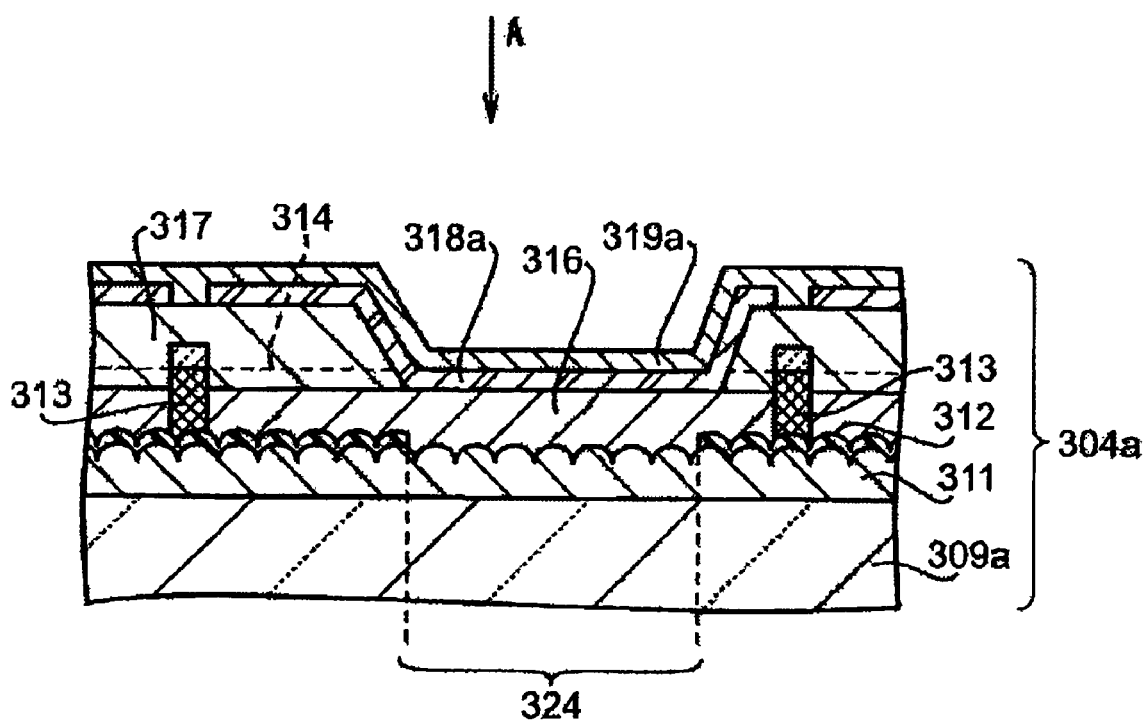
FIG. 15(a) is a cross sectional view of the color filter substrate according to the fourth embodiment of the present invention as viewed along the arrow XVa—XVa shown in FIG. 14.
FIG. 15(b) is a cross sectional view of the color filter substrate according to the fourth embodiment of the present invention as viewed along the arrow XVb—XVb shown in FIG. 14.
Figure 15:
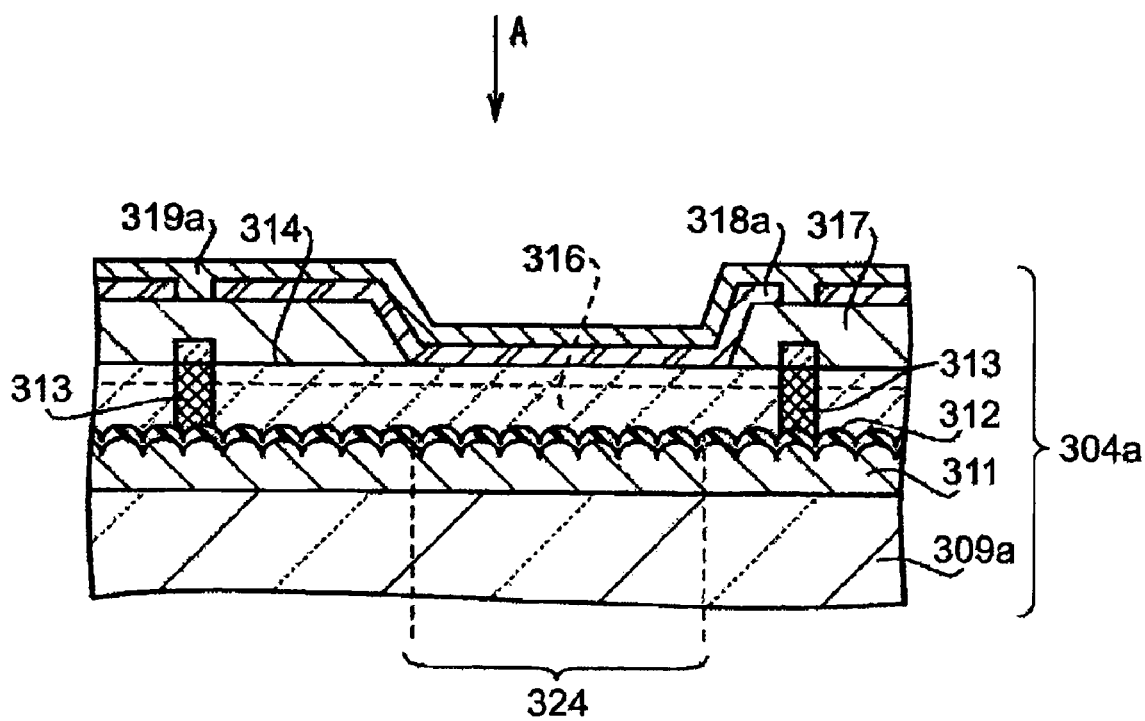

FIG. 14 shows a two-dimensional constitution of one pixel area of the first substrate 304*a*, as viewed from the direction of the arrow A in FIG. 17. This viewing direction is the same as the direction in which the viewer views the display. FIG. 15(*a*) is a cross sectional view of the first substrate 304*a* viewed along the line XVa—XVa shown in FIG. 14. FIG. 15(*b*) is a cross sectional view of the first substrate 304*a* viewed along the line XVb—XVb shown in FIG. 14. In FIG. 15(*a*) and FIG. 15(*b*), the first substrate 304*a* includes a first substrate member (rear substrate) 309*a* which is made of light transmissive glass, light transmissive plastic or any other light transmissive material. A resin layer 311 is formed on the liquid crystal side of the first substrate member 309*a*, over which is formed a reflective film 312. Here, the resin layer 311 functions as a resinous scattering layer, and the reflective film 312 functions as a scattering reflective layer.

The reflective layer 312 has light blocking members 313 and transparent banks 314 formed thereon. The light blocking members 313 function as colored boundary layers while the transparent banks 314 function as uncolored boundary layers. The light blocking members 313 are formed so as to extend vertically relative to the plane of the paper of FIG. 15, and therefore in the top to bottom direction in FIG. 14. The transparent banks 314 are formed in the left to right direction in FIG. 15, and therefore in the left to right direction in FIG. 14 likewise. In other words, the transparent blocks 314 extend in an orthogonal direction to the light blocking members 313. Coloring elements (coloring layer) 316 are formed in the square regions framed by transparent bank 314 and light blocking member 313. The coloring elements 316 are colored in R, G or B, and are formed in a regions enclosed by the transparent banks 314 and the light blocking members 313, one color in each enclosed region. As provisionally shown in FIG. 14, the R coloring members are called 316r, the G coloring members 316g, and the B coloring members 316b. In the present embodiment, these coloring elements 316 are arranged in a stripe-like manner as shown in FIG. 20(a). These coloring elements 316 constitute a color filter.

In FIG. 15(a) and FIG. 15(b), an overcoat layer 317 is formed over the light blocking members 313, the transparent bank 314, and the coloring elements 316. A strip shaped transparent electrode (counter electrode) 318a is formed over the overcoat layer 317. An orientation film 319a is formed over the transparent electrode 318a. The orientation film 319a is subjected to an orientation-rendering treatment such as a rubbing treatment, for orienting the liquid crystal molecules near the orientation film 319a. A polarizing plate 321a is attached to the outside surface of the first substrate member 309a by gluing or otherwise, as shown in FIG. 17.

In FIG. 15(a) and FIG. 15(b), the surface of the resin layer 311 is rendered irregular, such as being rugged. The surface of the reflective film 312, which is stacked over resin layer 311, is also rendered rugged. The pattern of the rugged surface as viewed from the direction of the arrow A is rendered random. The rugged surface causes the reflective film 312 to scatter incident light reflected thereon. The transparent electrode 318a, which is a strip-shaped piece, extends along a direction perpendicular to the paper surface of FIG. 15(a) and FIG. 15(b). Adjacent transparent electrodes 318a are separated from each other at a distance approximately equal to the width of the light blocking members 313. The separation renders a plurality of transparent electrodes 318a appear to be stripe-like shaped when viewed from the direction of arrow A.

Figure 16:
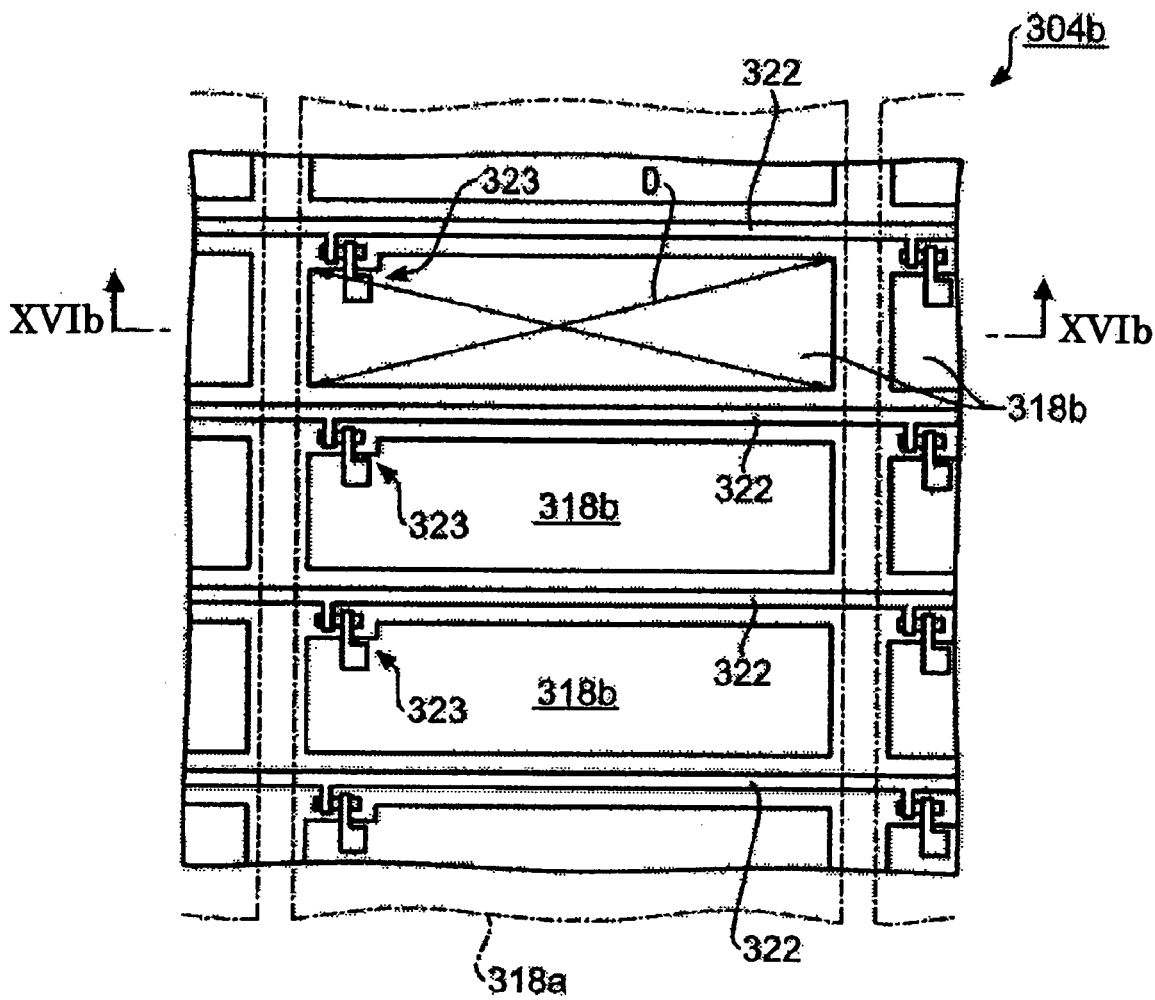
FIG. 16 is a top view of one pixel section of the element substrate of the liquid crystal device or the electro-optical device according to the fourth embodiment of the present invention.
Figure 16:
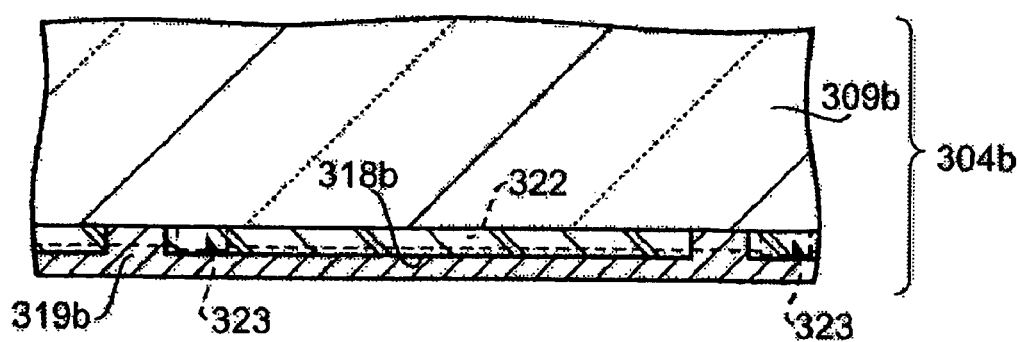

In FIG. 18, the first substrate 304a and the second substrate 304b face each other across the liquid crystal layer 308. FIG. 16(b) shows the cross sectional view of the second substrate 304b along line XVIb—XVIb shown in FIG. 16(a). In FIG. 16(b), the second substrate 304b includes a second substrate member (front substrate) 309b made of a light transmissive glass, plastic or another material. A line wiring 322 which has a linear form, TFD elements 323 which are active elements, and dot electrodes (pixel electrodes) 318b which are transparent, and orientation film 319b are all formed on a liquid crystal side surface of the second substrate 304. The orientation film 319b is given an orientation-rendering treatment such as rubbing, for orienting the liquid crystal molecules near the orientation film 319b. The rubbing direction of the surface of the orientation film 319a that faces the first substrate 304a in FIG. 18 and that of the surface of the orientation film 319b that faces the second substrate 304b cross each other at an appropriate angle depending on the crystalline characteristics. In FIG. 17, the polarizing plate 321b is glued or otherwise attached to the outside surface of the second substrate member 309b.

In FIG. 16(a), the dot electrode 318b is formed as a substantially square or rectangular shaped dot, and is connected to the line wiring 322 through the TFD element 323. The transparent electrode 318a, formed in a strip-like shape and disposed on the first substrate 304a side, is shown in FIG. 16(a) in broken lines for reference. The area where the dot electrode 318b and the transparent electrode 318a appear to overlap each other in a plan view constitutes one display dot region D. One display dot region D corresponds to one of the three colors, R, G and B. In the present embodiment of color display, three display dot regions D, which correspond to the three colors, R, G and B, constitute one pixel. In FIG. 18, the reflective film 312 has openings 324 formed thereon for each display dot region D to let the light pass through. These openings 324 are formed so as to allow the reflective film 312 to let the light pass through. As an alternative to providing the openings 324, the reflective film 312 may be reduced in thickness to give the reflective film 312 both light reflective and light transmissive functions.

Figure 19:
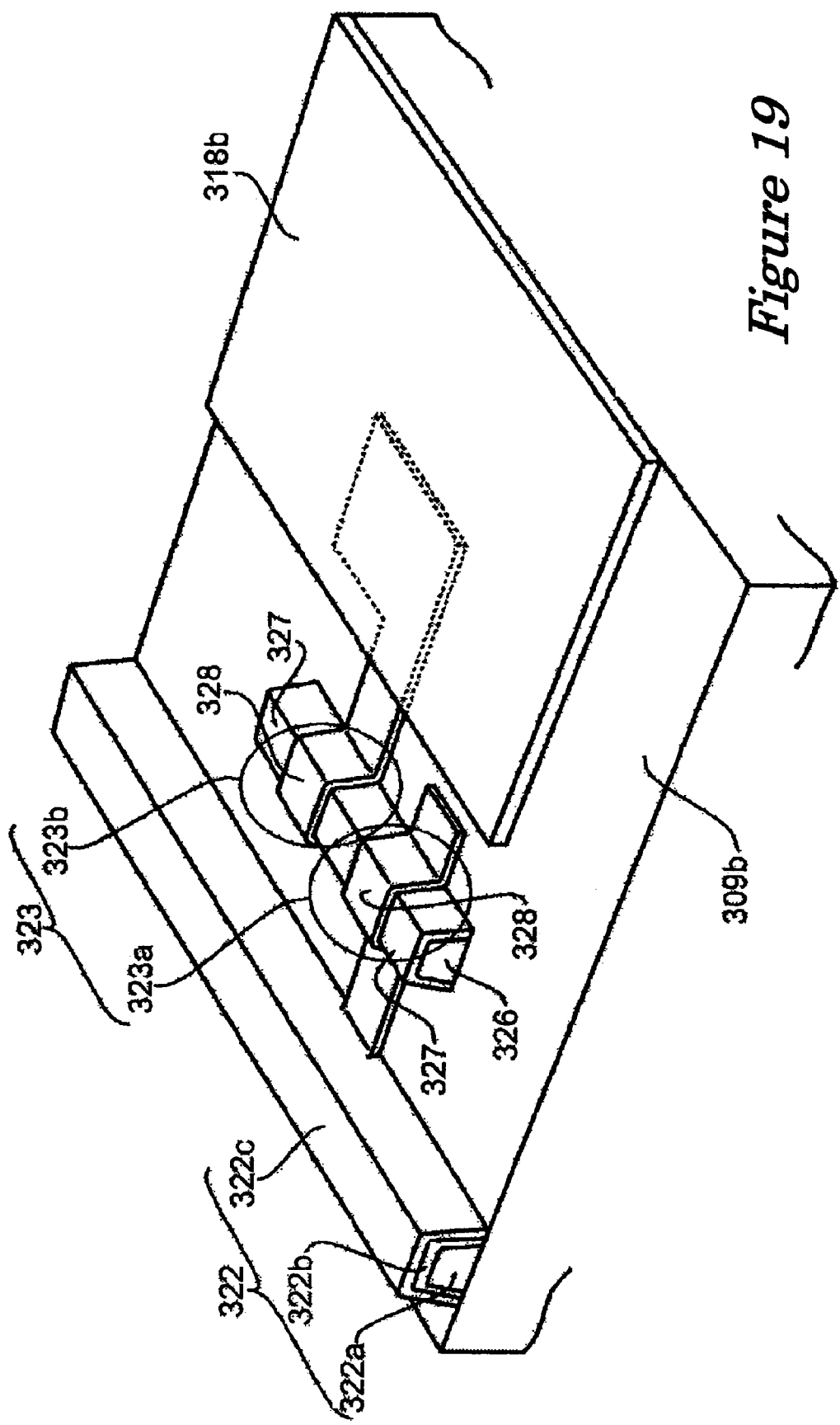
FIG. 19 is an oblique view of a switching element used in the liquid crystal device according to the fourth embodiment of the present invention shown in FIG. 17.

The TFD element 323 shown in FIG. 16(a) is formed by connecting a first TFD element 323 and a second TFD element 323b in series, as shown in FIG. 19. The TFD element 323 is formed, for instance, in the following manner. Firstly, a first layer 322a of the line wiring 322 and a first metal 326 of the TFD element 323 are formed with TaW (tantalum tungsten). Secondly, a second layer 322b of the line wiring 322 and an insulation membrane 327 of the TFD element 323 are formed by an anodizing process. Thirdly, a third layer 322c of the line wiring 322 and a second metal 328 of the TFD element 323 are formed with Cr (chrome), for example.

The second metal 328 of the first TFD member 323a extends out of the third layer 322c of the line wiring 322. The dot electrode 318b is formed so as to overlap with the tip of the second metal 328 of the second TFD member 323b. If an electric signal is to flow from the line wiring 322 in the direction toward the dot electrode 318b, the electric signal would flow through the first TFD member 323a, from the second metal 328 to the insulation film 327 and thence to the first metal 326. On the other hand, in the second TFD member 323b, the electric signal would flow from the first metal 326 to the insulation membrane 327, then to the second metal 328.

To reiterate, a pair of electrically opposed TFD members are connected in series between the first TFD member 323a and the second TFD member 323b. It is known that a TFD element in such a construction, commonly called a back-to-back construction, offers more stable characteristics than a TFD element constituted with only one TFD member.

In FIG. 17, the second substrate 304b includes an overhang portion 329 that projects beyond the first substrate 304a. A wiring 331 and a terminal 332 are formed on a surface of the overhang portion 329 that faces the first substrate 304a. One driver IC 333a and two driver ICs 333b are installed through an ACF (anisotropic conductive film), which is not illustrated, in a region where the wiring 331 and the terminals 332 are gathered.

The wiring 331 and the terminals 332 are formed on the second substrate 304b concurrently when the line wiring 322 and the dot electrodes 318b are formed. The line wiring 322 extends onto the overhang portion 329, becomes a wiring 331 thereon, and becomes connected to the driver IC 333a. There are spherical or cylindrical conducting members (not illustrated in Figures) that are mixed into the sealing member 306, which glues the first substrate 304a and the second substrate 304b together. The transparent electrodes 318a, which are formed over the first substrate 304a, extend over the first substrate 304a up to the location of the sealing member 306, and thereupon are connected through the conductive members to the wiring 331 on the second substrate 304b. The transparent electrodes 318a, which are on the first substrate 304a, are thus connected to the driver IC 333b, which is on the second substrate 304b.

In FIG. 17, an illumination device 303 is disposed facing the outside surface of the first substrate 304a, which is a component of the liquid crystal panel 302. The illumination device 303 includes a light guide 336, which is a square plate and is made of transparent plastic, for example; and LEDs 337, which are point sources of light. A light reflective sheet (not illustrated in the Figures) may be additionally installed on the surface of light guide 336, which is facing the liquid crystal panel 302. A light diffusing sheet (not illustrated in the Figures) may also be installed on the surface of light guide 336, which is facing the liquid crystal panel 302. Additionally, a prism sheet (not illustrated in the Figures) may also be installed over the light diffusing sheet. Although three LEDs 337 are used in the present embodiment, only one, two or more than three LEDs 337 may also be used. A line light source such as a cold cathode tube, or other point light sources can also be used in lieu of the LED.

An explanation follows with regard to a liquid crystal device constituted as described in the foregoing.

If external light of sufficient brightness is available, external light such as sunlight or room light is taken inside the liquid crystal panel 302 through the second substrate 304b, as shown by an arrow F in FIG. 18. This external light F, after passing through the liquid crystal layer 308, is reflected by the reflective film 312 and supplied to the liquid crystal layer 308. If, on the other hand, the external light is insufficient, the LEDs 337 of the illuminating device 303 shown in FIG. 17 are lit. Here, the light from the LEDs 337, which are a point-source light, is directed inside the light guide 336 through a light entrance surface 336a of the light guide 336, and thereafter emitted as a surface light from the surface that faces the liquid crystal panel 302, which is a light emitting surface 336b. As shown by an arrow E in FIG. 18, light from the entire light emitting surface 336b is supplied, now as a surface-source light as opposed to point-source light, to the liquid crystal layer 308, through the openings 324, which are formed in the light reflective film 312.

While light is being supplied to the liquid crystal 308 in the foregoing manner, the driver ICs 333a and 333b in FIG. 17 control the liquid crystal panel 302. A scanning signal, for instance, is supplied to the line wiring 322 while a data signal, for instance, is supplied to the transparent electrode 318a concurrently. Here, if the TFD element 323 (see FIG. 16(a)) associated with a particular display dot assumes the selected status (that is, the "on" state) in response to a voltage differential between the scanning signal and the data signal, an image signal is written to the liquid crystal capacitance within that display dot. Thereafter, if the particular TFD element 323 assumes the unselected status (that is, the "off" state), that image signal is stored in the display dot and drives the liquid crystal 308 within the display dot.

As seen, the liquid crystal molecules of the liquid crystal layer 308 are controlled for each display dot. That is, light passing through liquid crystal layer 308 of each display dot D is modulated. As the light so modulated passes through polarizing plate 321b which is located on the second substrate 304 side in FIG. 17, characters, numbers, patterns and other images are displayed in the effective display region of the liquid crystal panel 302. A display that uses the external light reflected off the reflective film 312 shown in FIG. 18 is the display in the reflective display mode. A display that uses the light from the illuminating device 303 is the display in the transmissive display mode. In the present embodiment, the reflective display mode and the transmissive display mode may be used as desired by the user or as automatically selected to suit the ambient environment.

As shown in FIG. 14, in the present embodiment, the transparent banks 314 are provided at the boundaries of the coloring elements 316r, 316g and 316b. The reflective films 312, shown in FIG. 15(a) and FIG. 15(b), are exposed externally at the transparent banks 314, such that external light incident on the inside of liquid crystal panel 302, and in particular incident on the region of the coloring elements 316, becomes a reflected light in the color of the respective coloring element 316 through which the external light passed. If the external light enters the transparent bank 314, the external light becomes an uncolored and bright reflected light. The uncolored and bright reflected light that is emitted from the transparent bank 314 provides bright color display in the reflective display mode.

In conventionally designed generic liquid crystal displaying device, a light blocking element, which is something similar to the light blocking member 313 of the present embodiment, is provided as a black mask at locations corresponding to those of the transparent bank 314 of the present embodiment. As described in Japanese Patent Application Publication 10-186347 and Japanese Patent Application No. 2002-230291, an uncolored light reflecting region, in other words a region of exposed reflective film, is provided within a region surrounded by the black mask as a member separate from the black mask in order to increase the brightness of the display in the reflective display mode. By contrast, the present embodiment includes transparent banks 314 that are themselves rendered transparent, it is possible to allow a sufficient area for the coloring element 316. As a result, the liquid crystal display of the present embodiment outputs reflected light that has not only at a high brightness but also sufficient color saturation.

Additionally, it is desirable to vary the areas of the exposed transparent region for each of the R, G and B coloring elements 315. Such transparent regions are determined for each coloring element 316 to balance the R, G and B colors appropriately. For example, if the area of a display dot is 15123 $\mu m^2$, the required area Ar for the R coloring element 316r is set as Ar=681 $\mu m^2$, the required area Ag for the G coloring element 316g is set as Ag=2003 $\mu m^2$, and the required area Ab for the B colored element is set as Ab=1014 $\mu m^2$.

Since in the current embodiment, the required area of the exposed region of the reflective film, or the transparent region, is different for R, G and B colors, the areas of transparent banks 314 are set differently depending on the color of the coloring element 316 that is adjacent to the bank 314. To reiterate, where the area of the transparent bank 314 at the boundary between an R coloring element 316r and a B coloring element 316b is Arg, the area of the transparent bank 314 between a G coloring element 316g and a B coloring element 316b is Agb, and the area of the transparent bank 314 between a B coloring element 316b and an R coloring element 316r is Abr, the following relationship preferably stands:

Arg≠Agb≠Abr

More specifically, the required areas Ar, Ag and Ab of the exposed parts of the R, G and B and the areas of the transparent banks Arg, Agb, and Abr satisfy the followings:

Arg=Ar/2+Ag/2

Agb=Ag/2+Ab/2

Abr=Ab/2+Ar/2

In other words, the amount of the exposed area that one coloring element is required to have is provided by two transparent banks that are adjacent to the coloring element. More specifically, half of the required area for one coloring element is provided by one adjacent transparent bank, the other half is provided by another adjacent transparent bank.

As evident from FIG. 14 and FIG. 16(a), when the liquid crystal panel 302 (see FIG. 17) is formed by combining the first substrate 304a and the second substrate 304b, the line wiring 322, which is on first substrate 304a, overlaps with the transparent bank 314, which is on the second substrate 304b, when viewed from the direction of arrow A in FIG. 17. Here, the line wiring 322 functions as a black mask, which blocks light from reaching the viewer. In consideration of the foregoing fact, it is desirable to form the area of the transparent bank 314 wider than the area of the line wiring 322. Moreover, if the area of the line wiring 322 is represented by $A_L$, the areas Arg, Agb, Abr of the transparent bank 314 which is disposed between adjacent pairs of coloring elements 316r, 316g and 316b can be respectively described as:

$$Arg = Ar/2 + Ag/2 + A_L$$

$$Agb = Ag/2 + Ab/2 + A_L$$

$$Abr = Ab/2 + Ar/2 + A_L$$

With the above arrangement, it is possible to secure for each of the three colors sufficient area of exposed region of the reflective film outside the region in which the line wiring 322 that functions as a black mask is disposed. Accordingly, it is possible to provide desired level of brightness in the reflective display mode.

In the foregoing embodiment, the present invention was applied to semi-transmissive-reflective liquid crystal displaying devices of active matrix type using TFD elements, which are 2-terminal type switching elements. The present invention is, however, also applicable to liquid crystal displaying devices of active matrix type using TFT (thin film transistor), which are 3-terminal type switching elements. The present invention is likewise applicable to simple matrix type liquid crystal devices that use no switching elements. The present invention is further applicable to reflective type liquid crystal devices. The present invention is still further applicable to non-liquid crystal type electro-optical devices such as organic EL devices, plasma display devices and many others.

Method of Manufacturing Color Filter Substrate

Figure 21:
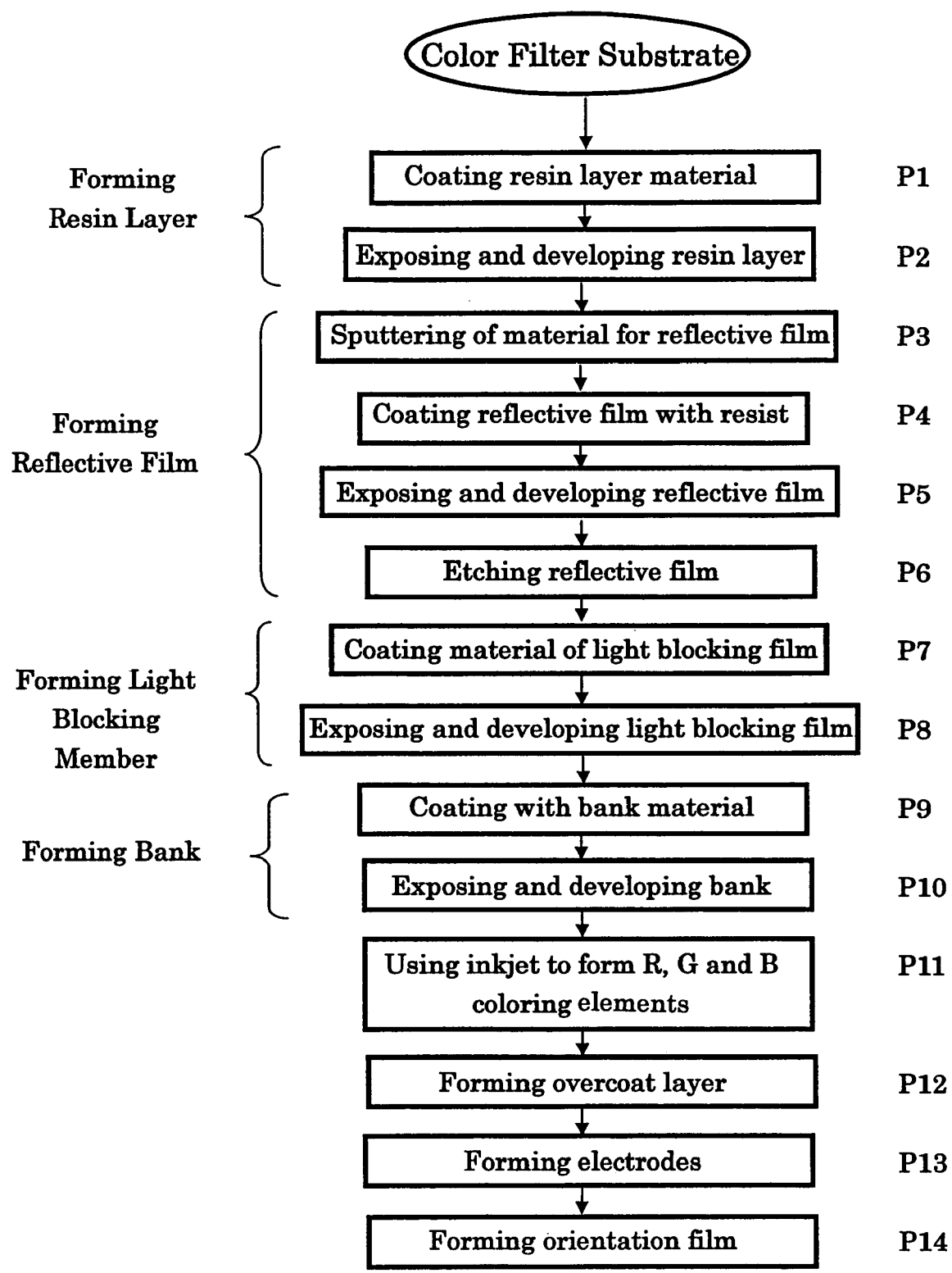
FIG. 21 is a flowchart of the process of manufacturing the color filter substrate according to the fourth embodiment of the present invention.

An explanation of method of manufacturing a color filter substrate 304a in accordance with an embodiment of the present invention, with reference to FIGS. 14, 15, and 21.

FIG. 21 shows one embodiment of the color filter substrate manufacturing method. In process P1, the material for the resin layer 311 shown in FIG. 15, which is a photosensitive resin in the present embodiment, is applied over the substrate 309a evenly. Next, in process P2, the layer of the resin layer material is exposed and developed to form the resin layer 311. Concurrently, a randomly rugged pattern is formed over the surface of resin layer 311. These processes result in formation of the resin layer 311 having a randomly rugged irregular surface.

Next, in process P3, the material for reflective layer 312 shown in FIG. 15, which is for example Cr, is applied over the resin layer 311 evenly by a sputtering process. In process P4, a resist material is applied evenly over the material layer of the reflective layer 312 which has just been applied, and exposed and developed to form a resist film of a desired pattern. In process P5 that follows, the material layer of the reflective layer 312 is exposed to light and developed using the aforementioned resist film is as a mask. In process P6, the surface is etched to form the reflective layer 312 over the resin layer 311. An opening 324 is formed in this process in each of the display dots D. In this manner, the reflective film 312 is now formed with the opening 324 disposed in each display dot D.

In process P7, the reflective film 312 is coated evenly with a material for light blocking member, such as a black or other colored photosensitive resin. In process P8, the coated material is exposed to light and developed into the light blocking member 313 in a stripe-like pattern, as shown in FIG. 14. In process P9, the reflective film 312 is coated evenly with material for the transparent bank 314, such as transparent photosensitive resin. In process P10, the applied bank material is exposed to light and developed into a plurality of transparent banks 314 in a stripe-like pattern extending in a direction at a right angle relative to the light blocking members 313. Here, the term "transparent" refers to a light that has transmissivity in excess of that of coloring element 316. Preferably, such transparent film should have light transmission rate of 50% or greater, and most preferably 80% or greater, against light having a wavelength between 400 nm and 700 nm. In view of the fact that the transparent banks 314 will be formed with an inkjet process, as will be described below, the transparent bank 314 should be preferably made of fluoric or other ink repellant material.

The areas Arg, Agb and Abr of each transparent banks 314 are determined according to their respective adjacent colored member 313. However, specifically how the areas Arg, Agb and Abr are determined has already been explained in the aforementioned embodiment of color filter substrate. Therefore, detailed explanation is omitted herein.

With the above-described processes, a plurality of square regions that is enclosed by the light blocking members 313 and the transparent banks 314 is formed on the substrate 309a in a dot matrix pattern. Where there is a light blocking member 313, a reflective film 312 thereunder is obscured from view. On the other hand, where there is a transparent bank 314, a reflective film 312 thereunder is left exposed externally due to the transparency of the transparent bank 314. As discussed in the embodiment of the color filer substrate above, the are of the transparent bank 314 is determined depending on the area of an exposed part of the reflective film 312 required by each of the color elements 313. The area of the line wiring 322 on the opposite substrate is also taken into consideration as may be required.

Figure 22:
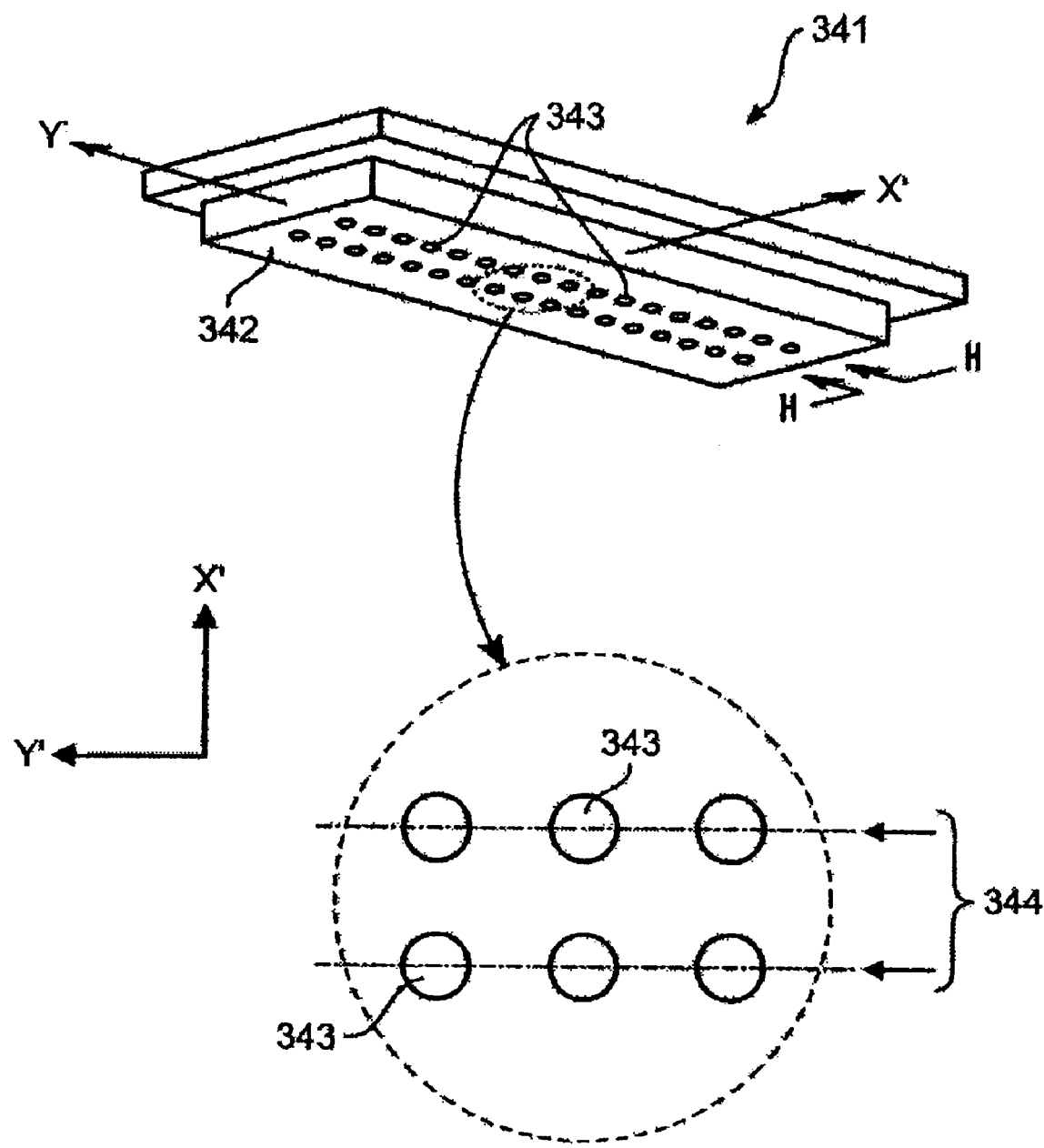
FIG. 22 is an oblique view of the inkjet head used in the manufacturing process shown in FIG. 22.

Next, in process 11 in FIG. 21, an inkjet technology is used to deposit droplets of the material of coloring element 316 into a region framed by the light blocking member 313 and the transparent bank 314. The inkjet technology produces a film by, for example, an inkjet head 341 shown in FIG. 22 that scans the horizontal plane along the X' and Y' arrows. The inkjet head 341 includes a casing 342 which is approximately rectangular in shape, and a plurality of nozzles 343 formed at the bottom surface of the casing 342. The nozzles 343 are minute openings having a diameter that is approximately 0.02 to 0.1 mm.

In the present embodiment, the plurality of nozzles 343 is formed in two rows, forming nozzle rows 344. Liquid material is supplied to each nozzle row 344 in a direction of arrows H shown in FIG. 22. The supplied liquid material is jetted out of each nozzle 343 as minute droplets according to the vibration of a piezo element. Although the number of the nozzle rows 344 is two in the embodiment of FIG. 22, it may be one or three or greater. If there are three or more rows, it is possible to have each of the nozzle rows 344 of one inkjet head 341 jet out different one of the R, G and B coloring element materials.

Figure 23:
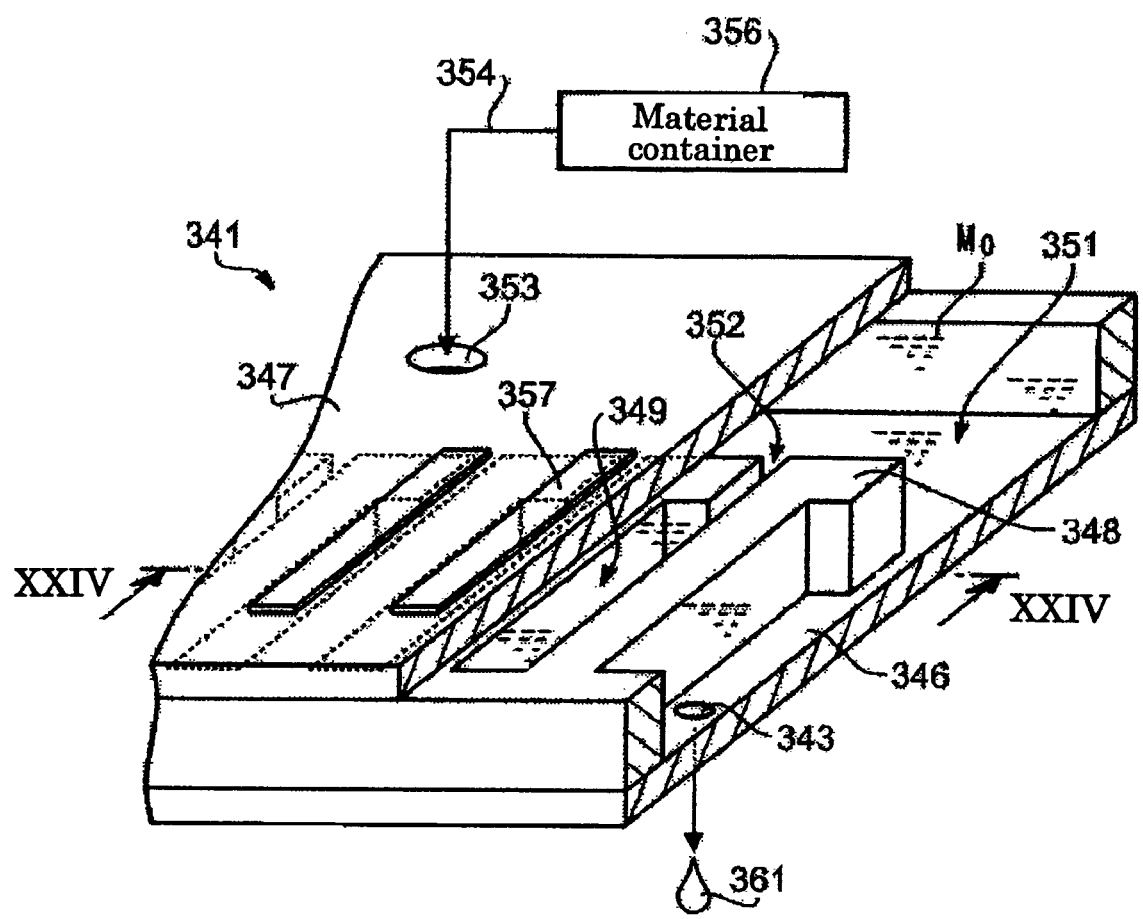
FIG. 23 is an oblique view of the inkjet head shown in FIG. 22.

Referring to FIG. 23, the inkjet head 341 includes a nozzle plate 346 made of, for instance, a stainless steel, a vibration plate 347 disposed opposite the nozzle plate 346, and a plurality of partition members 348 which couples to the nozzle plate 346 and the vibration plate 347. A plurality of storage chambers 349 for storing liquid material and a liquid reservoir 351 for temporary collection of liquid material are formed by each partition member 348. The liquid reservoir 351 and a plurality of the storage chambers 349 communicate with each other through passages 352. A supply hole 353 for supplying the liquid material therethrough is formed at an appropriate location on the vibration plate 47. The supply hole 353 is connected to a material container 356 through a pipe 354. The material container 356 stores the material for the coloring elements 316. A liquid material M0 supplied from the material container 356 fills the liquid reservoir 351 and further fills the storage chamber 349 through the passage 352.

Figure 24:
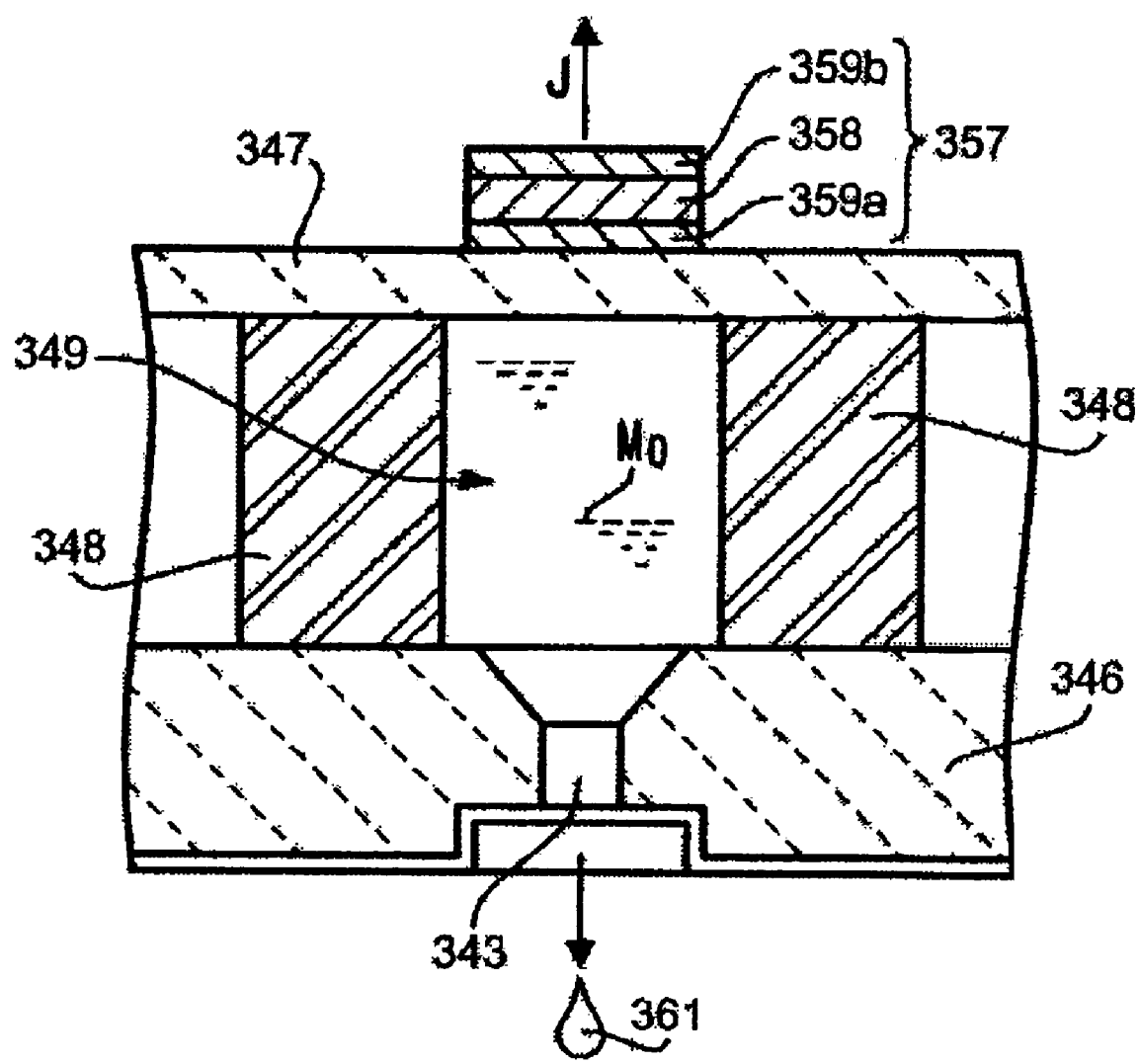
FIG. 24 is a cross sectional view of the inkjet head shown in FIG. 22, as viewed along the arrow XXIV—XXIV in FIG. 23.

The nozzle plate 346, which is part of the inkjet head 341, includes the nozzles 343 for spraying liquid material in a jet-like manner from the storage chamber 349. As previously explained with reference to FIG. 22, the nozzle row 344 includes a plurality of nozzles 343. A pressurizer 357 which pressurizes the liquid material is attached to a surface of vibration plate 347 that faces the storage chamber 349. The pressurizer 357 includes a piezo element 358 and a pair of electrodes 359a and 359b which sandwiches and holds the piezo element 358 as shown in FIG. 24.

On passing the electricity between the electrodes 352a and 352b, the piezo element 358 distortedly deforms to project outward in the direction of arrow J, thereby increasing the volume of the storage chamber 349. Accordingly, the liquid material MO flows from the liquid reservoir 351 to the storage chamber 349 via the passage 352 by a volume equivalent to the increase in the volume of the storage chamber 349.

When the passing of the electricity to the piezo element 358 is stopped, the piezo element 358 and the vibrating plate 347 return to the original state, and the volume of the storage chamber 349 also returns to the original volume. As a result, the pressure on the liquid material within the storage chamber 349 increases, jetting the liquid material out of the nozzle 343 as droplets 361. The droplets 361 are jetted out stably as minute droplets regardless of the kind of solvent or other ingredients that might be included in the liquid material.

A dedicated inkjet head 341 is provided for each of the R, G and B coloring elements 316. The inkjet heads 341 are placed at different points on the production line. The inkjet heads 341 each produces coloring elements 316 of respective color. In some cases, one inkjet head 341 may have a supply system for all three coloring element materials so that the one inkjet head 341 alone can deposit three different coloring materials.

By forming the coloring elements 316 with the ink jetting technology that uses the aforementioned inkjet head system, it is possible to reduce the consumption of coloring element material greatly, as compared to a case where the coloring elements are formed with a conventional patterning technology that uses photolithography. The production process is also significantly simplified.

When the coloring element 316 is formed by the inkjet method, an overcoat layer 317, shown in FIG. 15, is formed in process P12 in FIG. 21. Then, in process P13, a transparent electrode 318a in FIG. 15 is formed with ITO or other transparent electric conductive material through photolithography and etching. In process P14, an orientation film 319a is formed using such material as polyimide. The color filter substrate 304a is thus completed.

In the method of manufacturing the color filter substrate in accordance with the present embodiment, the use of inkjet head technology significantly simplifies and economizes manufacture of the color filter substrates shown in FIG. 14 and FIG. 15. Also, since the transparent bank 314 is intrinsically transparent, the display in the reflected display mode can provide a bright-colored display by using bright and uncolored reflected lights. Furthermore, a high color saturation can be maintained because it is possible to secure large areas for the coloring elements 316.

In the present embodiment, the invention was applied to manufacturing methods of a semi-transmissive-reflective liquid crystal displaying device of active matrix type that uses TFD elements, which are 2-terminal type switching elements. The invention, however, is also applicable to manufacturing methods of a liquid crystal displaying device of active matrix type that uses TFT elements (thin film transistor), which are 3-terminal type switching elements. The invention is likewise applicable to manufacturing methods of a simple matrix type liquid crystal device that uses no switching elements. The invention is also applicable to manufacturing methods of a reflective type liquid crystal device. The invention is further applicable to manufacturing methods of a non-liquid crystal type electro-optical device such as organic EL device, plasma display device, Field Emission Display and Surface-Conduction Electron-Emitter display and many others.

Fifth Embodiment

An explanation of an electronic instrument in accordance with a fifth embodiment of the present invention will follow. This embodiment shows only an example of this invention. Therefore, the scope of the present invention is not limited to this particular embodiment.

Figure 25:
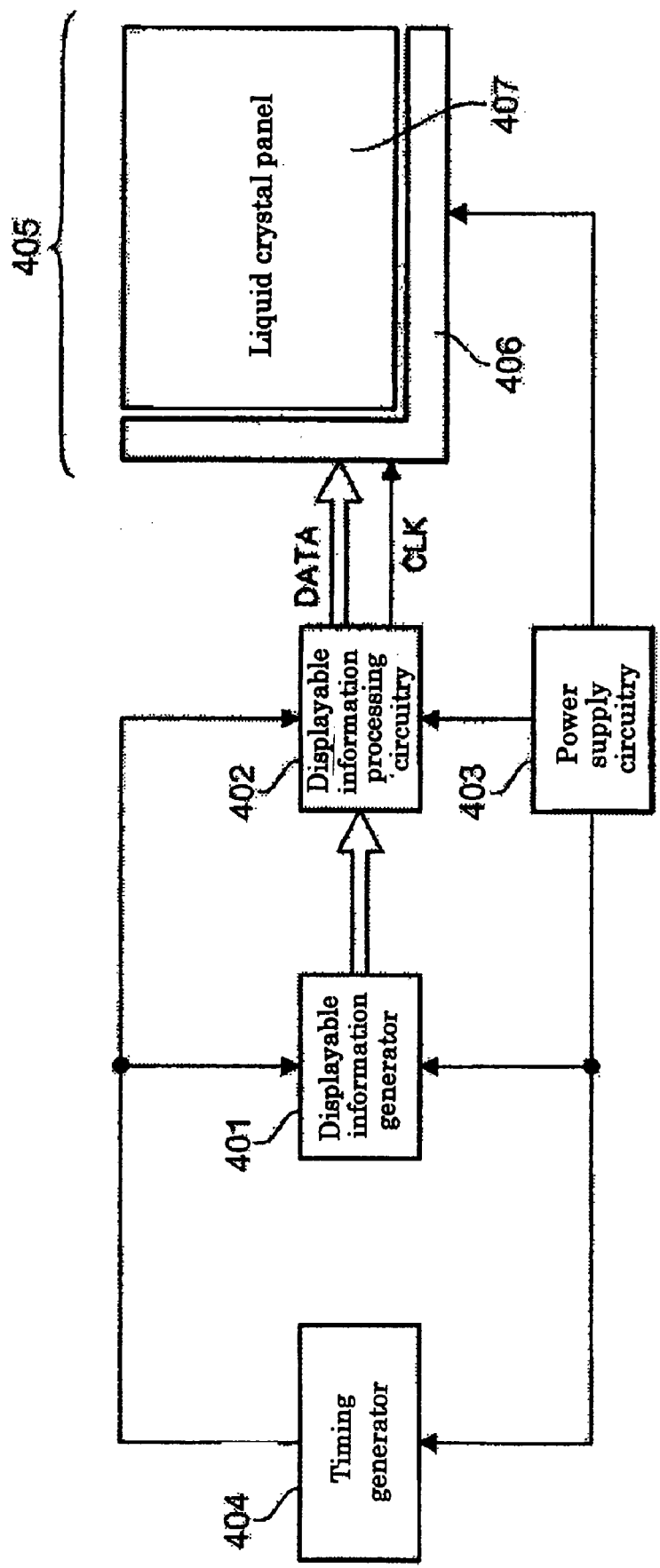
FIG. 25 is a schematic view of the electronic instrument according to the fifth embodiment of the present invention.

FIG. 25 shows an electronic instrument in accordance with an embodiment of the present invention. The electronic instrument includes a displayable information generator 401, a displayable information processing circuitry 402, a power supply circuitry 403, a timing generator 404 and a liquid crystal device 405. The liquid crystal device 405 further includes a liquid crystal panel 407 and a driver circuitry 406.

The displayable information generator 401 includes a memory such as a RAM (random access memory), a storage unit such as various discs, and a synchronizing circuitry for synchronizing digital image signals and others. The displayable information generator 401 supplies displayable information such as image signals to the displayable information processing circuitry 401 in a prescribed format, in accordance with various clock signals that are generated by the timing generator 404.

Next, displayable information processing circuitry 402 includes various known circuitries such as amplifying and inverting circuitries, rotation the, gamma correction the, and clamping circuitries. The displayable information processing circuitry 402 processes displayable information that has been received, and supplies image signals, together with a clock signal CLK, to the driver circuitry 406. Here, a scanning line driver circuitry (not illustrated), a data line driver circuitry (not illustrated), an inspection circuitry and various other circuitries are collectively referred to as the driver circuitry 406. The power supply circuitry 403 supplies prescribed power voltages to all foregoing components. The liquid crystal device 405 may be, for instance, constituted in the same manner as the liquid crystal device 300 shown in FIG. 17.

Figure 26:
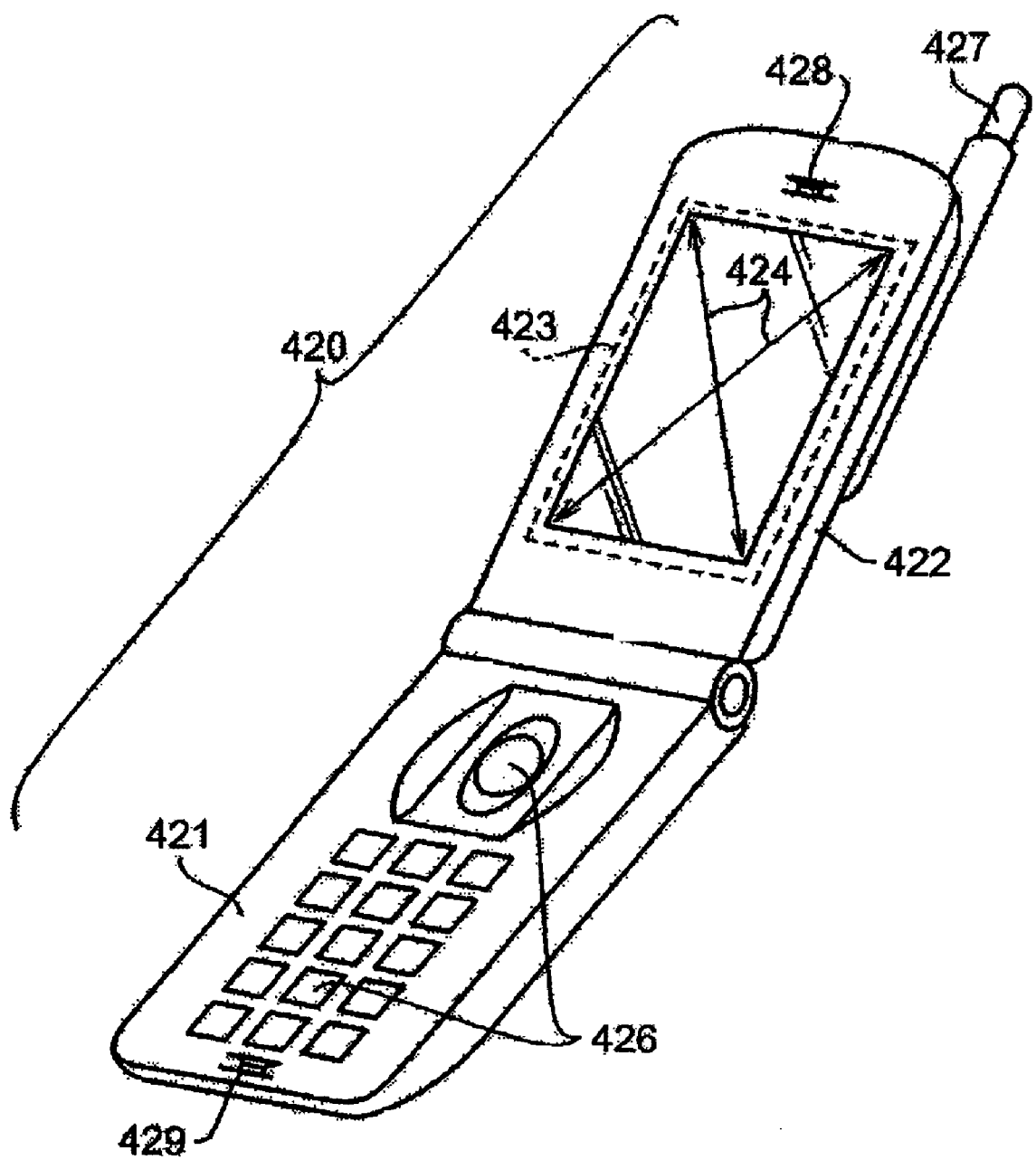
FIG. 26 is an oblique view of a portable telephone having a color filter substrate according to the present invention, as an example of the electronic instrument according to the fifth embodiment of the present invention.

FIG. 26 shows a portable telephone set as an example of an electronic instrument in accordance with the embodiment of the present invention. A portable telephone set 420, as shown, includes a main body 421 and a display unit 422. A display device 423 having a liquid crystal device or other electro-optical device in accordance with embodiments described above is disposed within the display unit 422, such that the display unit 422 can display various displays relating to telephone communications at the display screen 424.

An antenna 427 is retractably attached to one end of the display unit 422. A loudspeaker is disposed inside a voice receiver section 428, and a microphone is installed inside a voice transmitter section 429. The control section that controls the operation of the display device 423 is disposed within a main unit 421 or the display unit 422 either integrally with or separately from a control section that controls the entire portable telephone set 420.

Figure 27:
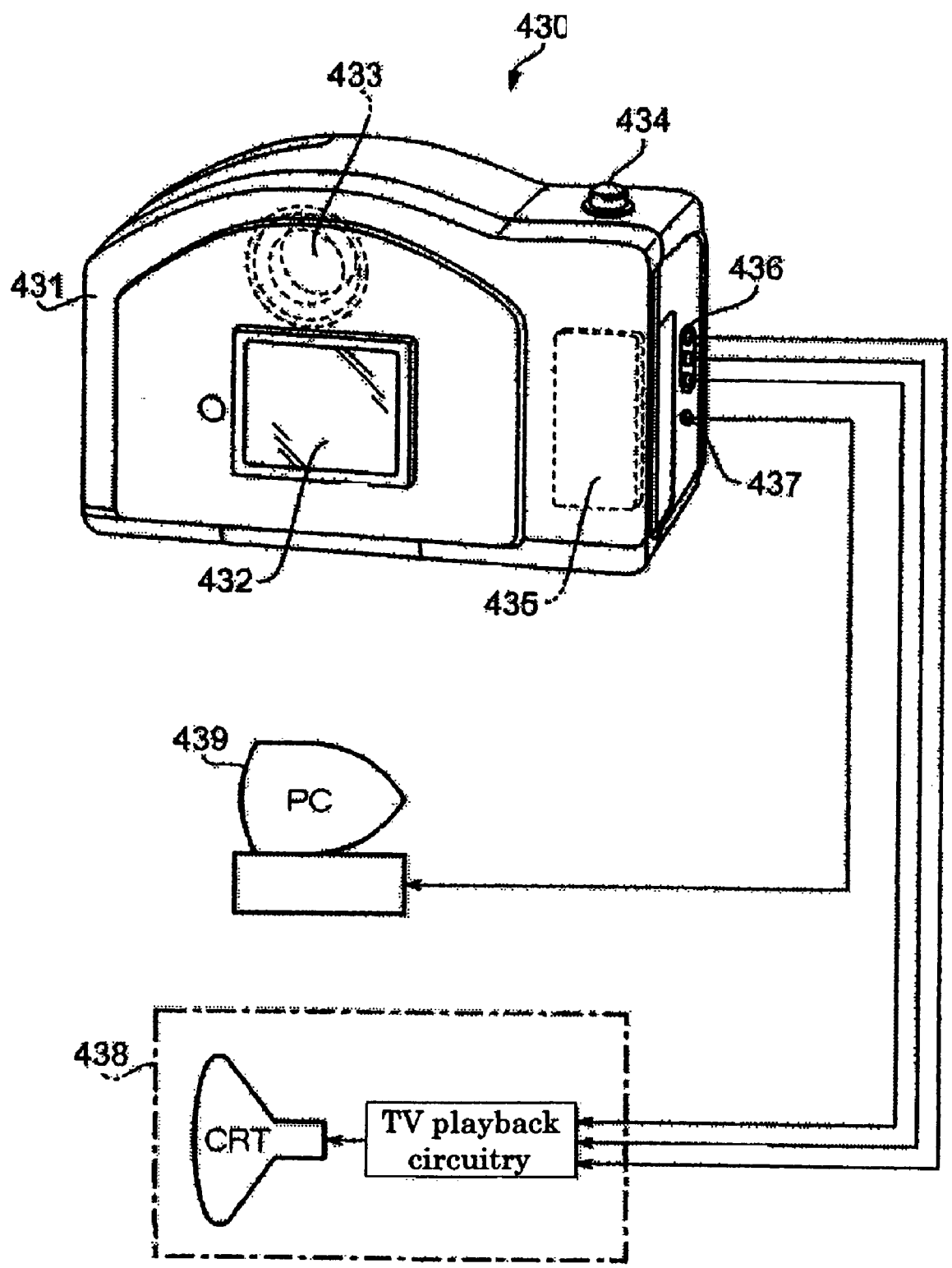
FIG. 27 is an oblique view of a digital camera having a color filter substrate according to the present invention, as an example of the electronic instrument according to the fifth embodiment of the present invention.

FIG. 27 shows a digital camera as another example of the electronic instrument in accordance with the present embodiment of the present invention. The digital camera has a liquid crystal device as a viewfinder. A liquid crystal display unit 432 is disposed on a surface of a case 431. Here, the liquid crystal display unit 432 functions as a viewfinder that displays the object to be photographed. The liquid crystal display unit 432 may be, for instance, a liquid crystal device 300 shown in FIG. 17.

The digital camera 430 further includes, on the front side (the back side of the drawing) of the case 431, a light receiving unit 433 having optical lenses and CCD (Charge Coupled Device). When a photographer, having verified an image of the object displayed on the liquid crystal display 432 unit, presses a shutter button 434, the CCD image signal of the particular instant is transferred to and stored in a memory on a circuit substrate 435.

A video signal output terminal 436 and a data communications input-output terminal 437 are disposed on a side surface of the case 431. A television monitor 438 is adapted to be connected to the video signal output terminal 436 as necessary. A personal computer 439 is also adapted to be connected to the data communications input-output terminal 437 as necessary. The image signal stored in a memory on the circuit substrate 435 is sent out to the television monitor 438 or the personal computer 439 through prescribed operations.

In the liquid crystal device of each of the foregoing electronic instruments, the transparent bank 314, which is installed to partition the coloring elements 316, partially exposes the reflective film. Accordingly, it is possible to obtain a bright color display in the reflective display mode because external light is reflected at the exposed region of the reflective film. Moreover, since a transparent film is used as the transparent bank 314, it is not necessary to form an exposed reflective region within the coloring element 316. Therefore, it is possible to obtain a display with high color saturation.

In addition to a telephone set and digital camera explained in the foregoing, the present invention is applicable to other electronic instruments such as personal computers, wristwatch type electronic instruments, PDAs (personal digital assistants), liquid crystal television sets, viewfinder type or direct-view monitor type video tape recorders, automobile navigation devices, pagers, electronic notebooks, portable calculators, electronic dictionaries, portable gaming machines, word processing devices, workstations, television telephone sets, and POS terminal equipments.

The color filter substrate in accordance with the present invention is used to give a color displaying function to liquid crystal devices and electro-optical devices such as organic EL devices. The electro-optical device in accordance with the present invention is suitably used as a display section of a portable telephone set, a portable information terminal, a PDA or other electronic instrument. Examples of electronic instruments in accordance with the present invention include portable telephone sets, portable information terminals, and PDAs. Particularly, electronic instruments in accordance with the present invention are capable of visually displaying various information.

The color filter substrate, the color filter substrate manufacturing method, the electro-optical device and the electronic instrument of the present invention include uncolored and colored boundary layers that partition the coloring layers in an orderly manner. The uncolored boundary layers brightly reflect light, such that the brightness of the display is increased. The colored boundary layers tolerate splattering of coloring material that may happen during the forming process of the coloring layers, since any splattering of coloring material on the colored boundary layers only has a negligible effect on the display quality. The banks that partition the coloring elements are transparent, thereby allowing the banks to function as the bare regions. Accordingly, it is possible to secure larger areas for the coloring elements to ensure sufficient color saturation, than a case where transparent regions for exposing the reflective film are formed inside the black mask. Since the coloring elements are disposed within a bank, it is possible to form the coloring elements using inkjet technologys such as the liquid droplet injection technology. The advantages of the inkjet technology include, among others, a simplified production process and reduction of waste in ink consumption.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Applications Nos. 2003-278434, 2003-318436, 2004-165777. The entire disclosure of Japanese Patent Applications Nos. 2003-278434, 2003-318436, 2004-165777 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A color filter substrate, comprising:
a transparent substrate;
a reflective film formed on the substrate;
a plurality of coloring elements formed on the reflective film, the coloring elements having at least two different colors; and
a plurality of transparent banks formed on the reflective film at boundaries between the coloring elements,
an area of each of the plurality of banks being determined based on the color of the coloring element adjacent to the bank.

2. The color filter substrate as set forth in claim 1, further comprising
a plurality of light blocking members formed on the reflective film at boundaries between the coloring elements.

3. The color filter substrate as set forth in claim 2, wherein
the plurality of banks extends linearly in a first direction so as to be parallel to one another, and
the plurality of light blocking members extends linearly in a second direction so as to be parallel to one another, the second direction being perpendicular to the first direction,
a gap between the banks being a second direction width of the coloring elements that are disposed between the banks,
a gap between the light blocking members being a first direction width of the coloring elements that are disposed between the light blocking members.

4. The color filter substrate as set forth in claim 1, wherein
a coloring element of a first color requires a transparent region whose area is $A_1$,
a coloring element of a second color requires a transparent region whose area is $A_2$, and
an area of a bank that is adjacent to the coloring element of the first color and the coloring element of the second color is $A_1/2+A_2/2$.

5. The color filter substrate as set forth in claim 1, wherein
each of the plurality of coloring elements has a color of one of red (R), green (G), and blue (B), and
the coloring elements are disposed such that their colors form a stripe-like pattern.

6. The color filter substrate as set forth in claim 1, wherein
the plurality of coloring elements is formed by depositing droplets of a prescribed liquid with a discharging device.

7. An electro-optical device comprising:
a color filter substrate according to claim 1;
a counter substrate disposed opposite the color filter substrate; and
an electro-optical layer provided between the color filter substrate and the counter substrate.

8. An electronic instrument comprising:
the electro-optical device according to claim 7, and control means for controlling the electro-optical device.

9. The color filter substrate as set forth in claim 1, wherein
the color filter is adapted to be disposed opposite an element substrate that has a plurality of line wirings therein,
the banks are adapted to be disposed opposite the line wirings, and
the banks are sized to be thicker than the line wirings.

10. The color filter substrate as as set forth in claim 9, wherein
a coloring element of a first color requires a transparent region whose area is $A_1$,
a coloring element of a second color requires a transparent region whose area is $A_2$,
an area of a bank that is adjacent to the coloring element of the first color and the coloring element of the second color is $A_1/2+A_2/2+A_L$.

11. A color filter substrate, comprising:
a light transmissive substrate;
a reflective layer formed on the substrate, the reflective layer having openings formed thereon;
a plurality of boundary layers formed on the reflective layer, some of the boundary layers being light transmissive boundary layers, and others being colored boundary layers; and
a plurality of coloring layers enclosed by the boundary layers,
the colored boundary layers being disposed between coloring layers of the same color,
the light transmissive boundary layers being disposed between coloring layers of different colors.

12. The color filter as set forth in claim 11, wherein
the plurality of coloring layers is formed by depositing droplets of a prescribed liquid with a discharging device.

13. The color filter substrate as set forth in claim 11, further comprising
an overcoat layer formed to cover the boundaty layers and the coloring layers,
the reflective layer having an irregular surface that scatters light, the boundary layers being formed on the irregular surface of the reflective layer.

14. The color filter substrate as set forth in claim 13, wherein
and area of each of the coloring layers is determined based on a width of an adjacent boundary layer.

15. The color filter substrate as set forth in claim 13, wherein
the plurality of coloring layers is formed by depositing droplets of a prescribed liquid with a discharging device.

16. The color filter substrate as set forth in claim 13, wherein
portions of the overcoat layer that are opposite the reflective layer are thicker than the rest of the overcoat layer.

17. An electronic instrument having the color filter substrate as set forth in claim 11.

18. A method of manufacturing a color filter substrate, comprising:
providing a substrate;
forming a reflective film on the substrate;
forming a plurality of rows of light blocking member, the rows of light blocking members extending in a first direction so as to be parallel to one another;
forming a plurality of rows of transparent banks, the rows of transparent banks extending in a second direction so as to be parallel to one another, the second direction being perpendicular to the first direction;
forming a plurality of coloring elements by depositing prescribed fluid in a plurality of deposit portions that are defined by the light blocking members and the transparent banks, the coloring elements having at least two different colors and being disposed so as to form a prescribed pattern, in the forming of the transparent banks, an area of each of the banks is determined based on the coloring elements that are adjacent to the bank.

19. The method of manufacturing a color filter substrate as set forth in claim 18, wherein:

a coloring element of a first color requires a transparent region whose area is $A_1$, a coloring element of a second color requires a transparent region whose area is $A_2$, and in the forming of the transparent banks, an area of a bank that is adjacent to the coloring element of the first color and the coloring element of the second color is $A_1/2 + A_2/2$.

20. The method of manufacturing a color filter substrate as set forth in claim 18, wherein:

each of the plurality of coloring elements has a color of one of red (R), green (G), and blue (B), and in the forming of the coloring elements, the coloring elements are disposed such that their colors form a stripe-like pattern.

21. A method of manufacturing a color filter substrate, comprising:

providing a light transmissive substrate;

forming a reflective layer on the substrate, the reflective layer having openings;

forming boundary layers on the reflective layer, some of the boundary layers being colored boundary layers, others being light transmissive boundary layers; and forming a plurality of coloring layers that are enclosed by the boundary layers, such that the colored boundary layers are disposed between coloring layers of the same color and the light transmissive boundary layers are disposed between coloring layers of different colors.

22. The method of manufacturing a color filter substrate as set forth in claim 13, wherein:

widths of the boundary layers are determined based on widths of the coloring layers during the forming of the boundary layers.

23. The method of manufacturing a color filter substrate as set forth in claim 21, wherein:

in the forming of the coloring layers, the plurality of coloring layers is formed by depositing droplets of prescribed liquids with a discharging device.

24. The method of manufacturing a color filter substrate as set forth in claim 18, wherein:

the color filter substrate is adapted to be disposed opposite an element substrate that has a plurality of line wirings therein, the banks are adapted to be disposed opposite the line wirings, and in the forming of the banks, the banks are sized to be thicker than the line wirings.

25. The method of manufcturing a color filter substrate as set forth in claim 24, wherein:

a coloring element of a first color requires a transparent region whose area is $A_1$, a coloring element of a second color requires a transparent region whose area is $A_2$, an area of the line wiring is $A_L$, and in the forming of the banks, an area of a bank that is adjacent to the coloring element of the first color and the coloring element of the second color is $A_1/2 + A_2/2 + A_L$.

26. A display device, comprising a front substrate;

a color filter substrate including a light transmissive substrate, a reflective layer formed on the substrate, the reflective layer having openings formed thereon, a plurality of boundary layers formed on the reflective layer, some of the boundary layers being light transmissive boundary layers, and others being colored boundary layers, and a plurality of coloring layers enclosed by the boundary layers, the colored boundary layers being disposed between coloring layers of the same color;

the light transmissive boundary layers being disposed between coloring layers of different colors, a plurality of electrodes disposed so as to correspond to the coloring layers;

orientation films that cover the plurality of electrodes;

polarizing plates attached to the front and back substrates;

an optical waveguide plate provided so as to cover the back polarizing plate; and a light source for supplying light to the optical waveguide plate.

27. The display device as set forth in claim 26, wherein widths of the boundary layers are determined based on widths of the coloring layers.

28. The display device as set forth in claim 26, wherein the plurality of coloring layers is formed by depositing droplets of a prescribed liquid with a discharging device.

29. The display device as set forth in claim 26, wherein the color film substrate further includes an overcoat layer formed to cover the boundary layers and the coloring layers, and the reflective layer has an irregular surface that scatters light, the boundary layers being formed on the irregular surface of the reflective layer.

30. The display device as set forth in claim 29, wherein widths of the boundary layers are determined based on widths of the coloring layers.

31. The display device as set forth in claim 29, wherein the plurality of coloring layers is formed by depositing droplets of a prescribed liquid with a discharging device.

32. The display device as set forth in claim 29, wherein portions of the overcoat layer that are opposite the reflective layer are thicker than the rest of the overcoat layer.

33. An electronic instrument having the display device according to claim 26.

* * * * *